United States Patent
Tulsi et al.

(10) Patent No.: US 12,132,994 B2
(45) Date of Patent: Oct. 29, 2024

(54) MOTOR MOUNT FOR IMAGE CAPTURE OF SURROUNDING ENVIRONMENT

(71) Applicant: Matterport, Inc., Sunnyvale, CA (US)

(72) Inventors: Japjit Tulsi, Sunnyvale, CA (US);
Louis Marzano, Sunnyvale, CA (US);
Abhijit Limaye, Sunnyvale, CA (US);
David Lippman, Sunnyvale, CA (US);
David Alan Gausebeck, Sunnyvale, CA (US)

(73) Assignee: Matterport, Inc., Sunnyvale, CA (US)

( * ) Notice: Subject to any disclaimer, the term of this patent is extended or adjusted under 35 U.S.C. 154(b) by 0 days.

(21) Appl. No.: 17/644,910

(22) Filed: Dec. 17, 2021

(65) Prior Publication Data

US 2023/0199316 A1  Jun. 22, 2023

(51) Int. Cl.
*H04N 23/695* (2023.01)
*G03B 17/56* (2021.01)
*H04N 5/222* (2006.01)

(52) U.S. Cl.
CPC ......... *H04N 23/695* (2023.01); *G03B 17/561* (2013.01); *G03B 17/566* (2013.01); *H04N 5/2224* (2013.01)

(58) Field of Classification Search
None
See application file for complete search history.

(56) References Cited

U.S. PATENT DOCUMENTS

| | | | | |
|---|---|---|---|---|
| 9,458,963 | B1* | 10/2016 | Choi | F16M 13/04 |
| 9,894,278 | B2* | 2/2018 | Wei | H04N 5/23287 |
| 11,106,928 | B2* | 8/2021 | Wang | F16M 11/18 |
| 11,372,445 | B2* | 6/2022 | Czerwinski, Jr. | G06F 1/1607 |
| 2012/0062691 | A1* | 3/2012 | Fowler | G03B 17/56 |
| | | | | 348/E5.026 |
| 2013/0229569 | A1* | 9/2013 | Bevirt | F16M 11/12 |
| | | | | 248/349.1 |
| 2014/0135062 | A1* | 5/2014 | Bevirt | H04M 1/04 |
| | | | | 455/556.1 |
| 2014/0209777 | A1* | 7/2014 | Klemin | F16M 11/041 |
| | | | | 29/525.08 |
| 2017/0307136 | A1* | 10/2017 | Wei | F16M 11/12 |
| 2017/0324941 | A1* | 11/2017 | Birkler | H04N 5/23296 |
| 2018/0316843 | A1* | 11/2018 | Guyot | H04N 5/23296 |
| 2019/0063668 | A1* | 2/2019 | Wei | F16M 11/2035 |
| 2020/0103939 | A1* | 4/2020 | Hsu | H04R 5/027 |
| 2021/0302922 | A1* | 9/2021 | Joosten | B25J 9/1697 |

* cited by examiner

*Primary Examiner* — Rodney E Fuller
(74) *Attorney, Agent, or Firm* — Ahmann Kloke LLP

(57) ABSTRACT

An example system comprises a base with a bottom end and a top end opposite the bottom end, a motor within the base, the motor being coupled to a rotational component of the base and configured to turn the rotational component about an axis of rotation, the rotational component being at the top end of the base, the axis of rotation being perpendicular to the top end of the base, and an arm coupled to the rotational component, the arm configured to move a holding member above the top of the base, the holding member configurable to hold a digital device above the top end of the base, the arm being adjustable to position and tilt the holding member, the rotational component being capable of turning the arm and the holding member, the arm configured to tilt the holding member at a first angle relative to the arm.

19 Claims, 23 Drawing Sheets

AMENDED FIG. 2

AMENDED FIG. 3

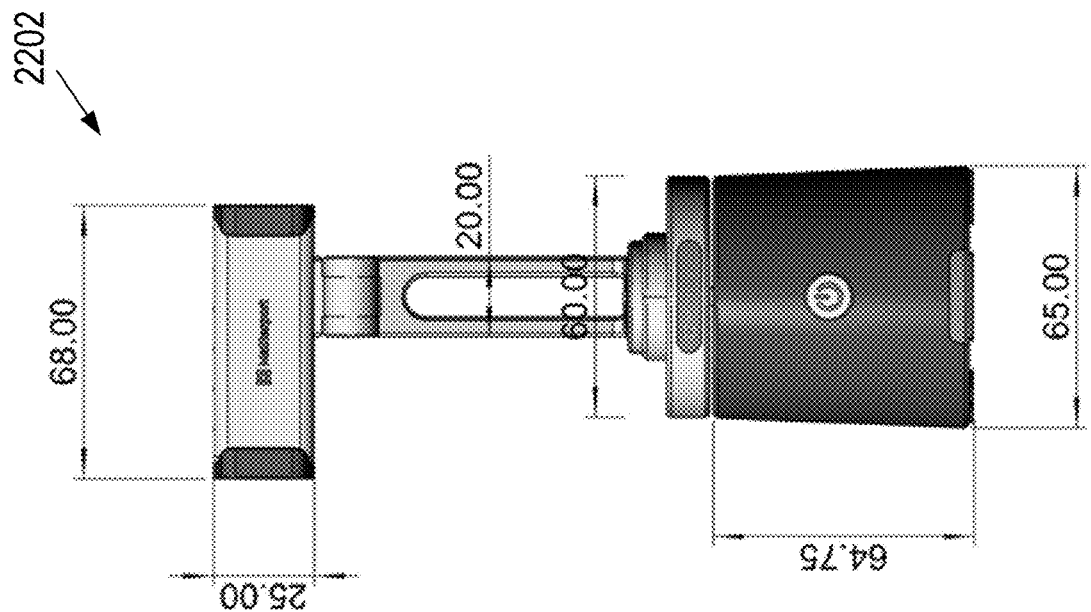
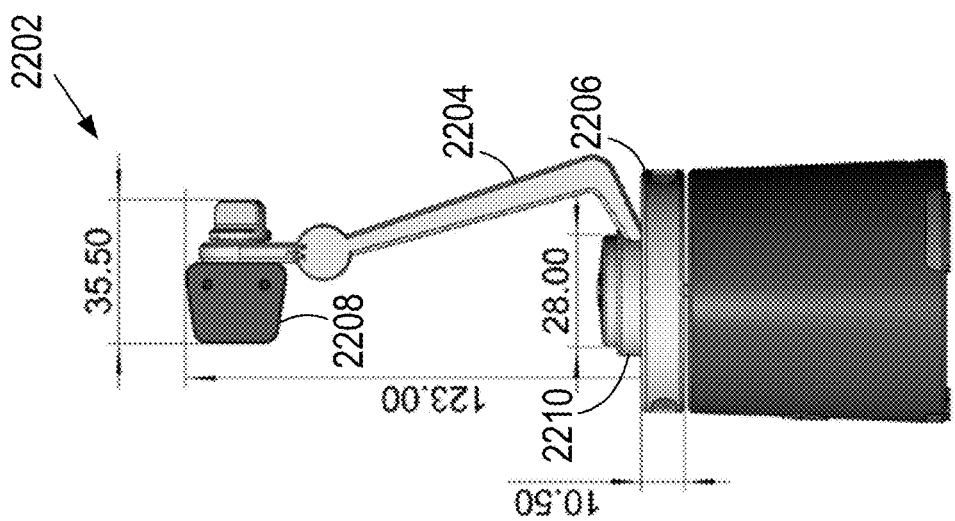
FIG. 22

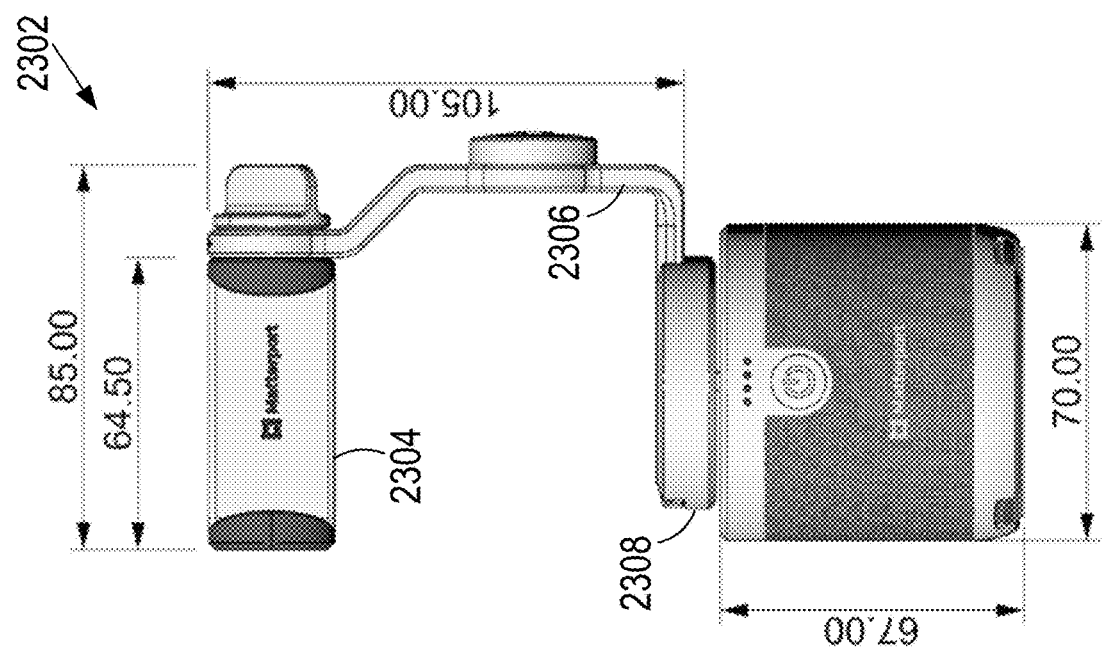
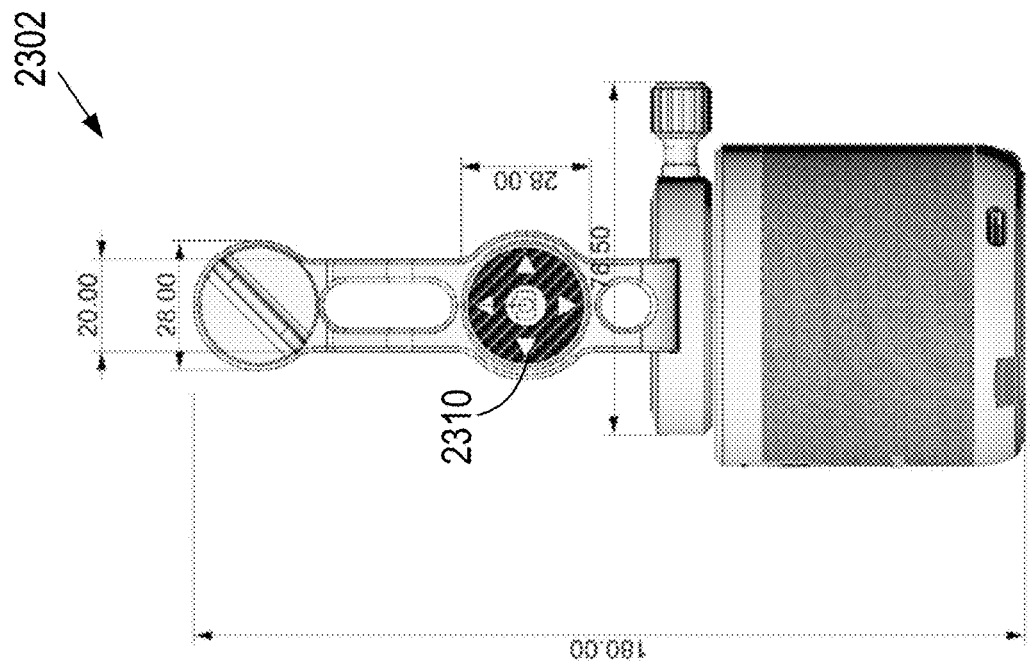
FIG. 23

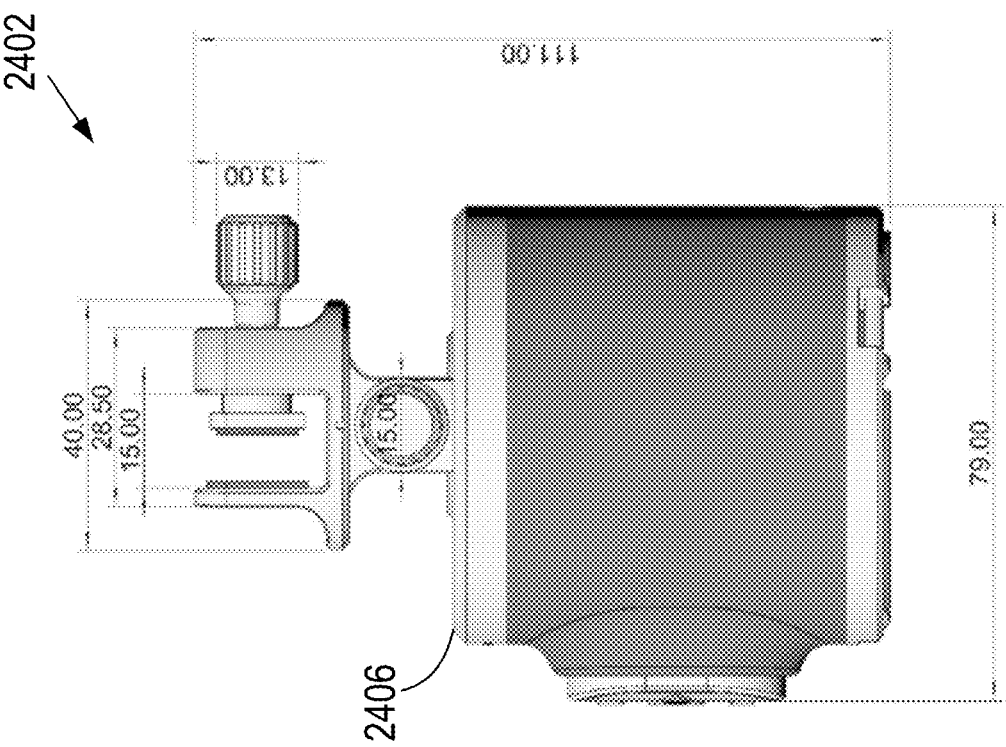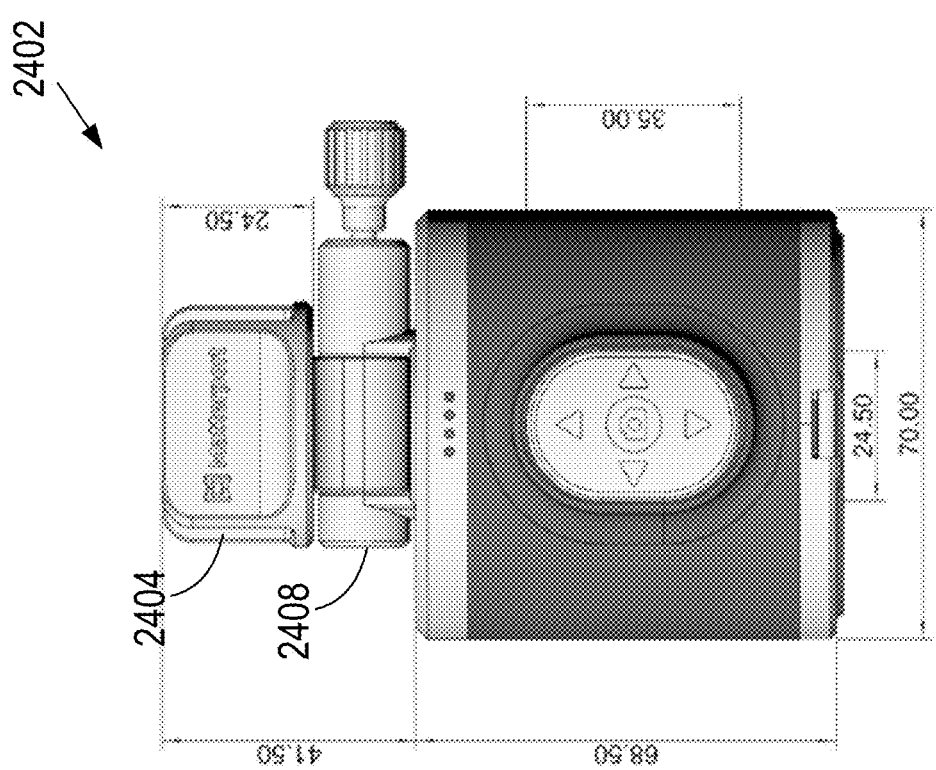
FIG. 24

MOTOR MOUNT FOR IMAGE CAPTURE OF SURROUNDING ENVIRONMENT

FIELD OF THE INVENTION(S)

Embodiments of the present invention(s) are generally related to a motorized mount for turning a digital device to capture images of the surrounding environment.

SUMMARY

In various embodiments, a system comprises a base with a bottom end and a top end opposite the bottom end, a motor within the base, the motor being coupled to a rotational component of the base and configured to turn the rotational component about an axis of rotation, the rotational component being at the top end of the base, the axis of rotation being perpendicular to the top end of the base, and an arm coupled to the rotational component, the arm configured to move a holding member above the top of the base, the holding member configurable to hold a digital device above the top end of the base, the arm being adjustable to position and tilt the holding member, the rotational component being capable of turning the arm and the holding member, the arm configured to tilt the holding member at a first angle relative to the arm.

In various embodiments, the motor capable of rotating the rotational component in a direction parallel to the bottom end of the base. The section of the arm may be perpendicular to a coupling section of the arm. The sliding section of the arm may be slidingly coupled across the rotational component and the section of the arm being perpendicular to the top end of the base. The sliding section of the arm may be coupled to the holding member in a position above the top of the base.

The system may further comprise an adjustable component configured to hold the arm at a particular position at the rotational component.

In some embodiments, the holding member may include two retaining members, wherein at least one of the two retaining members is adjustable to move towards the other of the two retaining members to widen or narrow a distance between the two retaining members. The retaining members may be capable of holding a digital device between them in a position whereby the axis of rotation passes through a camera of the digital device. The position of the holding member may be tilted such that the axis of rotation is at a desired position relative to a space (i.e., distance) between the two retaining members for aligning a field of view of the camera at the position where the axis of rotation passes through the camera body to reduce parallax error.

In some embodiments, the holding member is pivotably coupled to the arm. The holding member may be adjustable to change the first angle relative to the arm.

In some embodiments, the system further comprises a coupling joint configured to hold the holding member at the first angle relative to the arm. The system may be further configured to receive a signal and begin turning the rotational component by the motor.

In various embodiments, a system comprises a base with a bottom end and a top end opposite the bottom end, a motor within the base, the motor being coupled to a rotational component of the base and configured to turn the rotational component about an axis of rotation, the rotational component being at the top end of the base, the axis of rotation being perpendicular to the top end of the base, and an arm movably coupled to the rotational component, the arm including a holding means above the top of the base for holding a digital device above the top of the base, the arm being adjustable to move across an axis of rotation of the rotational component and position the holding means, the rotational component being capable of turning the arm, the arm configured to tilt the holding means at a first angle relative to the arm.

The motor may be capable of rotating the rotational component in a direction parallel to the bottom end of the base. A section of the arm (e.g., extension) may be perpendicular to a coupling section (e.g., sliding section) of the arm. The coupling section of the arm may be movably coupled to the rotational component and the section extending in a direction that is perpendicular to the top end of the base. In some embodiments, the section of the arm is coupled to the holding means in a position above the top of the base.

In some embodiments, the system includes an adjustable component configured to hold the arm at a particular position at the rotational component. The holding means may be configured to hold a digital device that includes a camera in a position whereby the axis of rotation passes through the camera. In some embodiments, the holding means is configured to hold the digital device at an angle to direct a field of view of the camera at a portion of an environment surrounding the system while the axis of rotation passes through the camera.

The holding means may be pivotably coupled to the arm. The holding means may be adjustable to change the first angle relative to the arm. The system may further comprise a coupling joint configured to hold the holding means at the first angle relative to the arm. In some embodiments, the system further comprises a receiver configured to receive an activation signal and begin turning the rotational component by the motor.

In various embodiments, a method comprises providing a base with a bottom end and a top end opposite the bottom end, installing a motor within the base, the motor being coupled to a rotational component of the base and configured to turn the rotational component about an axis of rotation, the rotational component being at the top end of the base, the axis of rotation being perpendicular to the top end of the base, and movably coupling an arm to the rotational component, at least a portion of the arm moving about the axis of rotation, the arm including at least one holding member above the top of the base for holding a digital device above the top of the base, the arm being adjustable to move the holding member over the rotational component, the rotational component being capable of turning the arm, the arm configured to tilt the holding member at a first angle relative to the arm.

BRIEF DESCRIPTION OF THE DRAWINGS

FIG. 22 depicts a side view and a front view of an alternative motor mount in some embodiments.

FIG. 23 depicts a side view and a front view of another alternative motor mount in some embodiments.

FIG. 24 depicts a side view and a front view of a different motor mount in some embodiments.

DETAILED DESCRIPTION

Figure 1:
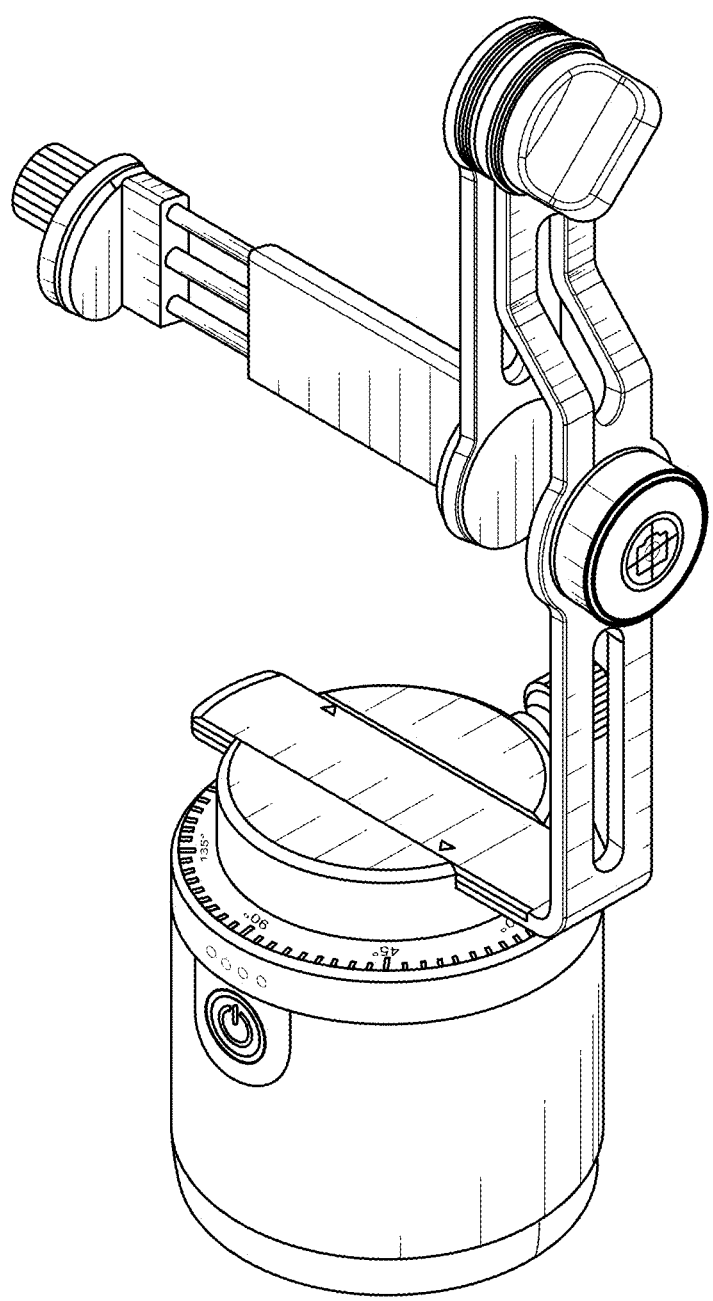
FIG. 1 depicts a motor mount for a smartphone in some embodiments.

Many of the innovations described herein are made with reference to the drawings. Like reference numerals are used to refer to like elements. In the following description, for purposes of explanation, numerous specific details are set forth in order to provide a thorough understanding. It may be evident, however, that different innovations can be practiced without these specific details. In other instances, well-known structures and components are shown in block diagram form in order to facilitate describing the innovations.

FIG. 1 depicts a motor mount 100 for a smartphone in some embodiments. Although the motor mount 100 depicted in FIG. 1 is described as being for a smartphone, it will be appreciated that many different digital devices with image capture components may be held by the motor mount 100. A digital device is any device with memory and a processor. An image capture component may be a camera, video camera, or the like.

In various embodiments, the motor mount 100 may include a rotational component and a mounting bracket that can turn the smartphone to enable the smartphone to capture images of an environment about the motor mount 100. For example, the smartphone may take images and then be turned by the motor mount 100. The motor mount 100 may then stop and the smartphone may take additional images in the new direction. Afterward, the motor mount 100 may turn the smartphone again to enable the smartphone to take additional images in another direction.

By utilizing a mounting bracket, the motor mount 100 may hold the smartphone at a no parallax point, tilt the smartphone such that the field of view of the camera is directed to a portion of the environment, and rotate the smartphone such that the camera stays at the no parallax point (e.g., at an axis of rotation) to reduce (or eliminate) parallax errors, increase the speed of image capture of the environment, reduce human error, and maintain the field of view of the different images taken at different directions. The images may then be combined to create a visualization (e.g., a 3D walkthrough) of the environment around the motor mount.

To maintain the camera of the smartphone at a no parallax point, in one example, the camera may be positioned over an axis of rotation of the motor mount 100. The camera may be positioned by adjusting a mounting bracket, positioning the mounting bracket (e.g., relative to the base), and positioning the smartphone within the mounting bracket as discussed herein. The camera of the smartphone may be maintained at the no-parallax point by sliding the smartphone upwards or downwards in the mounting bracket as well as adjusting a position relative to the base by sliding a bracket across the base of the motor mount 100.

In some examples, the motor mount 100 may turn at 90 degree intervals, 45 degree intervals, 30 degree intervals, or any predetermined intervals. It may be appreciated that the motor mount 100 may turn at any number of degrees before pausing to allow the smartphone to take pictures before turning again. In various embodiments, the motor mount 100 turns an equal number of degrees between pausing intervals. For example, the motor mount 100 may turn 90 degrees and then pause, then turn another 90 degrees and then pause, and then turn another 90 degrees and then pause. It may be appreciated that the motor mount 100 may turn at any degrees of rotation. In some embodiments, the motor mount 100 may turn at unequal degree rotations between pauses.

The smartphone may be held by a mounting bracket of the motor mount 100. The smartphone may be held at a particular angle to enable a field of view of the camera to be directed to a portion of the environment surrounding the smartphone. Subsequently, the motor mount 100 may be activated. The smartphone may take one or more images in one direction, and then motor mount 100 may turn the smartphone 90 degrees and stop. The smartphone may capture one or more images in this direction. Afterward, the motor mount 100 may turn the smartphone another 90 degrees (e.g., in a position such that the field of view of the camera of the smartphone is now directed to a position that is opposite of when the smartphone began to capture images) and stop. The smartphone may then take one or more images in this direction. Afterward, the motor mount 100 may turn the smartphone another 90 degrees and stop. The smartphone may then capture one or more images in this direction. In this example, the smartphone has taken at least four images at different positions about the motor mount 100.

It will be appreciated that the motor mount 100, in some embodiments, may turn while the smartphone captures images (e.g., without stopping). For example, the smartphone may capture images while the motor mount 100 is in motion (e.g., high-speed capture) and/or take video. In some embodiments, the motor mount 100 may turn before and/or after the smartphone captures images.

The motor mount 100 may hold a variety of different smartphones, regardless of the width of the smartphone. In some embodiments, the motor mount 100 may position a variety of different smartphones such that the camera of the smartphone is positioned along an axis of rotation of the motor mount 100 (e.g., the camera is positioned at the no parallax point) and the smartphone is tilted such that the field of view of the camera is directed towards the environment.

While enabling the capture of images about an environment is discussed with regard to a number of embodiments discussed herein (e.g., using a smartphone with a camera for capturing in the visible spectrum), it will be appreciated that images may be capture in any spectrum such as the visible spectrum, infrared spectrum, ultraviolet spectrum, and/or the like.

Figure 2:
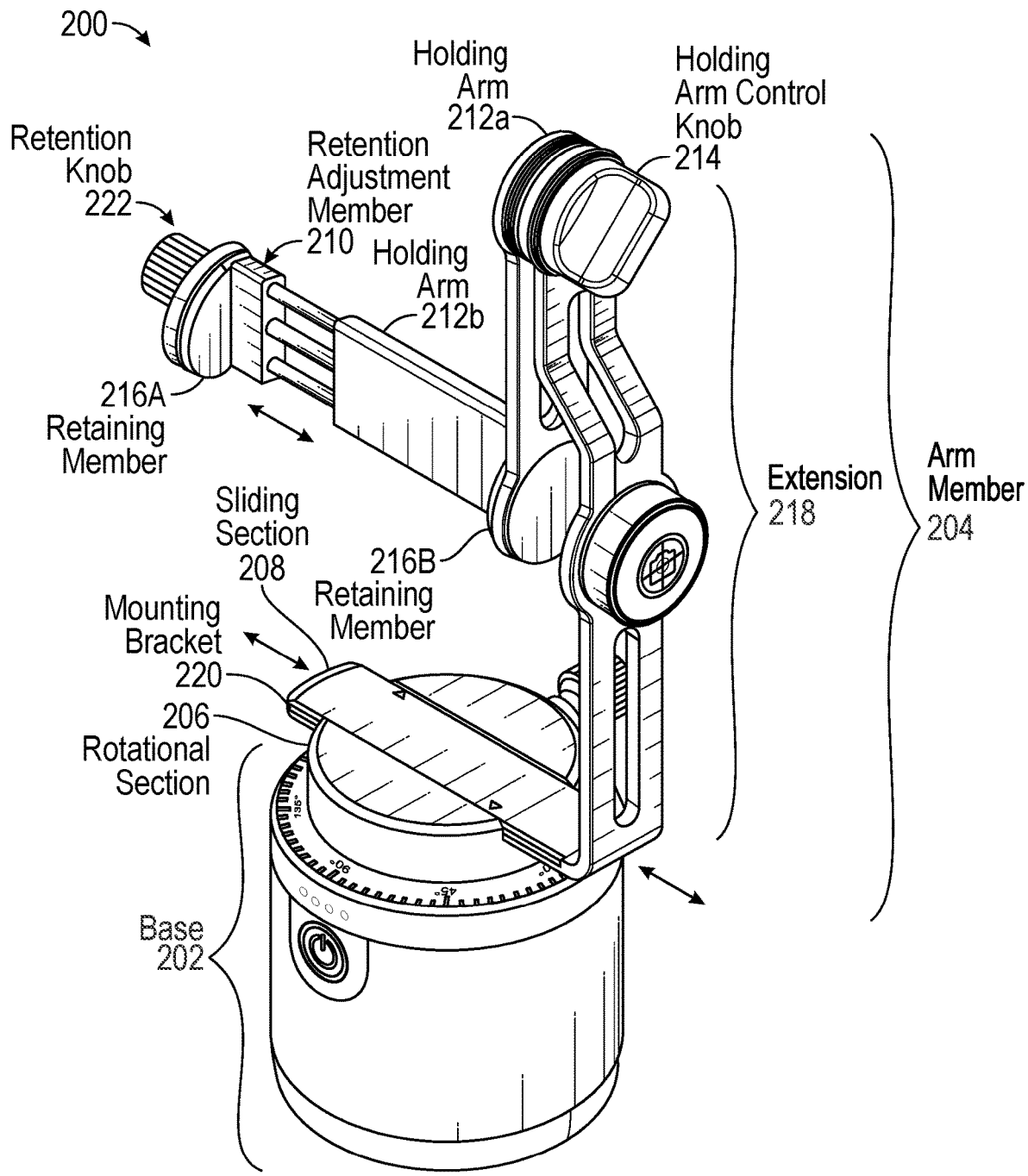
FIG. 2 depicts a perspective image of the motor mount in some embodiments.

FIG. 2 depicts a perspective image 200 of the motor mount 100 in some embodiments. The motor mount 100 comprises a base 202 coupled to a rotational section 206. The base may include a top end and a bottom end (e.g., see FIG. 6, top end 610 and bottom end 608). The rotational section 206 may be coupled to the top end. The bottom end may be opposite the top end and positioned on a support structure (e.g., table, mount, or tripod) or the floor. The rotational section 206 may be at the top end. In various embodiments, the rotational section 206 is a part of the base 202 (e.g., an outer cover or top part of the base 202 may rotate) or is a separate member (e.g., a disk or flat member) that is coupled to a motor in the base 202. The motor may turn the rotational section 206 in a plane that is parallel to the bottom end of the base 202 (e.g., parallel to the ground or floor of a surrounding environment).

Although the base 202 is depicted as being cylindrical, it will be appreciated that the base 202 may be any shape to provide the required stability during rotation and/or improve the image capture process.

Figure 7:
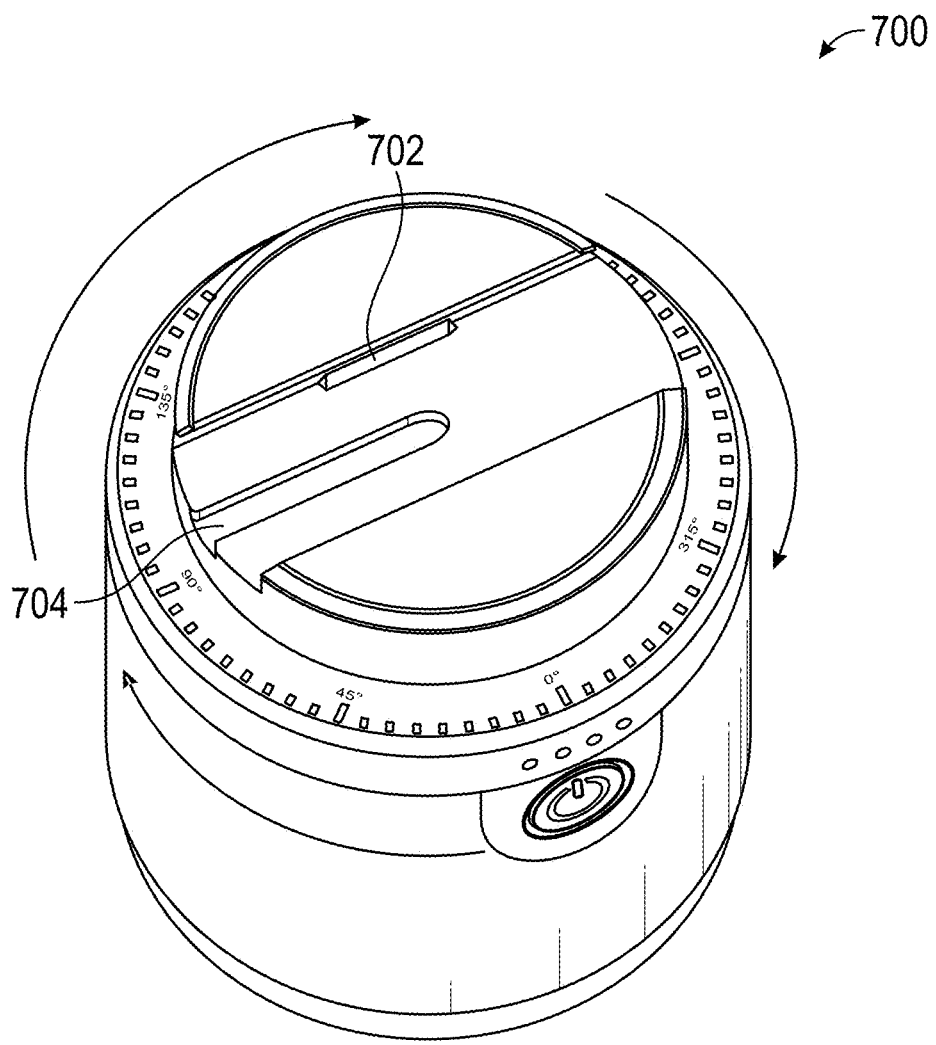
FIG. 7 depicts a top perspective view of the base in some embodiments.

FIG. 7 depicts a view 700 of the top end of the base 202 including the direction of the rotation of the rotational section 206. In this example, the rotational section 206 rotates in a clockwise direction in a plane that is parallel to a plane of the bottom end of the base 202. In some embodiments, the rotational section 206 may rotate counterclockwise.

Figure 4:
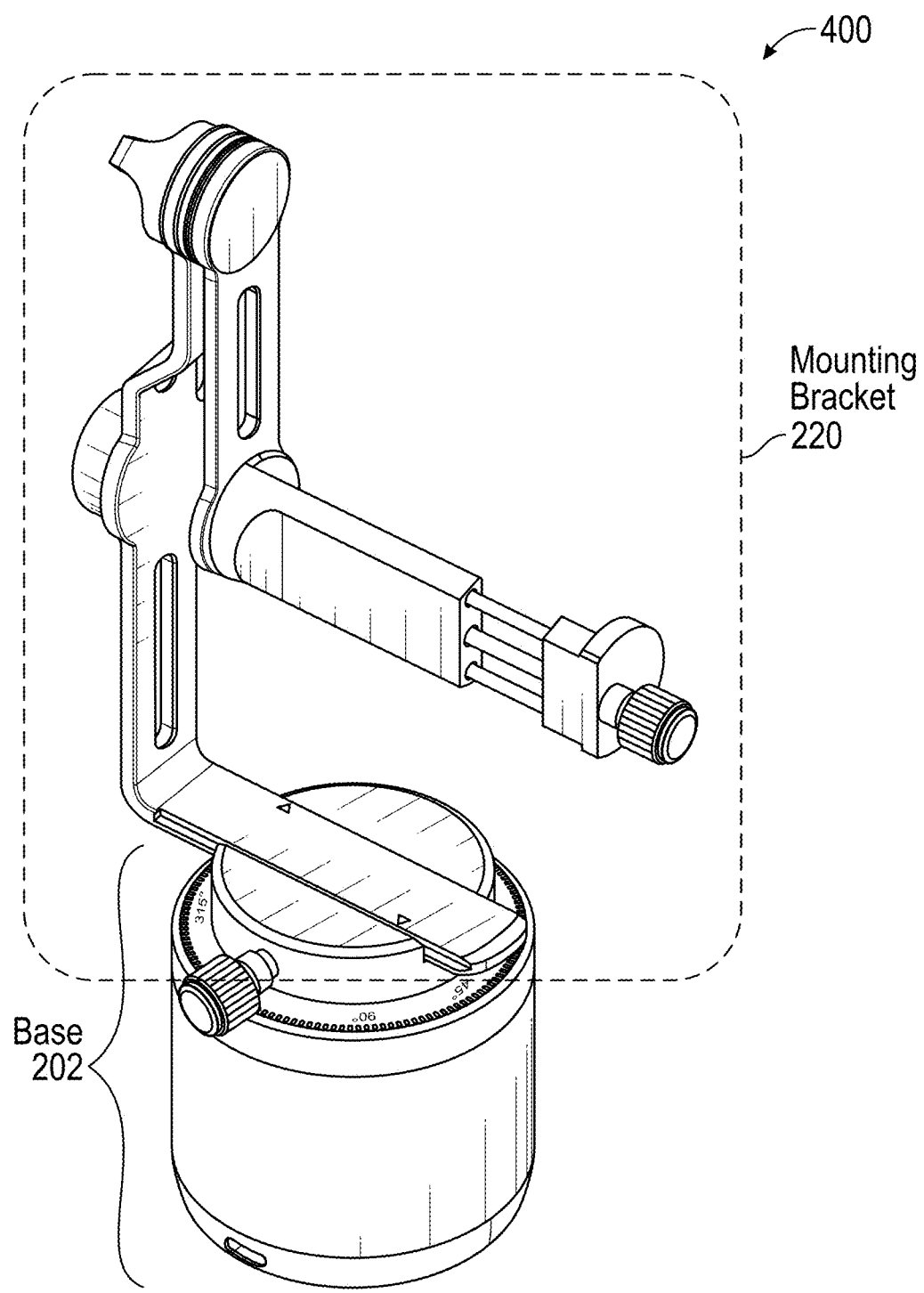
FIG. 4 is a back, perspective view of the motor mount depicting the base and the mounting bracket in some embodiments.

Returning to FIG. 2, a mounting bracket 220 may include the apparatus above the base 202 configurable to hold and position a digital device (e.g., a smartphone). FIG. 4 is a back, perspective view 400 of the motor mount 100 depicting the base 202 and the mounting bracket 220 in some embodiments.

The mounting bracket 220 may include the arm member 204, the holding arm 212a, the retention adjustment knob 210 (e.g., retention adjustment member), the holding arm 212b, the retaining member 216A and the retaining member 216B. The arm member 204 may include the sliding section 208 and the extension 218. In some embodiments, the extension 218 is perpendicular to the sliding section 208.

The arm member 204 (e.g., an arm) may be held (e.g., coupled) or movably coupled to the rotational section 206 and/or base 202. In the example depicted in FIG. 2, the arm member 204 includes a sliding section 208 that is slidingly coupled to the rotational section 206. It will be appreciated that the arm member 204 may couple to the rotational section 206 in any number of ways such as a reticulated member coupled to the rotational section 206 and capable of being moved in different directions. In another example, the arm member 204 may be coupled to the rotational section 206 using a movable component that may move in two or more different dimensions.

The sliding section 208 depicted in FIG. 2 may slide along an adjustment direction along a line that is in the plane of rotation of the rotational section 206. In various embodiments, when the mounting bracket 220 holds a smartphone, the mounting bracket may move or slide along the adjustment direction using the sliding section 208 to adjust the position of the retained smartphone such that the camera of the smartphone is moved to a position that intercepts the axis of rotation (discussed herein). By sliding the arm member 204 along the adjustment direction, the extension 218 may get closer or farther away from the axis of rotation. In various embodiments, the extension 218 is parallel to the axis of rotation.

The sliding section 208 depicted in FIG. 2 may be perpendicular to the extension 218. The extension 218 may extend away from the top end of the base 202. An end of the extension that is opposite the sliding section 208 may be movably coupled to the holding arm 212a.

The arm member 204 may include or be coupled to a holding component that is configurable to hold a smartphone or other digital device. In FIG. 2, the holding component includes the holding arm 212a and the holding arm 212b. The holding arm 212b is configurable to hold and support a smartphone. In various embodiments, the holding arm 212b includes a retention adjustment member 210 that may be adjusted to narrow or widen a space between a retaining member 216A and a retaining member 216B. In this example, the retention adjustment member 210 may move along a retention direction to enable the retaining member 216A and the retaining member 216B to hold the smartphone (e.g., by pinching the sides of the smartphone). In various embodiments, the retention direction is parallel to the adjustment direction and the plane of rotation. In some embodiments, the retention adjustment member 210 may include an internal spring such that pulling the retention adjustment member 210 apart (e.g., pulling the retention knob 222 away from the retaining member 216B) pulls on the spring and when the retention knob 222 (or the retention adjustment member 210 is released), then the retention adjustment member 210 is pulled together by the force of the spring).

The retention adjustment member 210 may be locked or otherwise set to a specific location by the retention knob 222. The retention knob 222 may include a screw for tightening the support members of along the holding arm 212b to prevent the retention adjustment member 210 from moving. In one example, a smartphone may be placed between the retaining member 216A and a retaining member 216B. The smartphone may also be supported in part by the holding arm 212b. The retention adjustment member 210 may move the retaining member 216A towards the retaining member 216B such that the smartphone is held between the retaining member 216A and the retaining member 216B. The holding arm 212b may then be tightened to retain a grip on the smartphone.

While FIG. 2 depicts a retention adjustment member 210 being adjustable to hold the smartphone using the retention knob 222. It will be appreciated that the smartphone may be held by sliding both ends of the holding arm 212b to grip the smartphone or only the holding arm 212b opposite the retention adjustment member 210. In some embodiments, rather than using a retention knob 222, the holding arm 212b may include a motor (e.g., a servomechanism or actuator) to automatically open or close the holding arm 212b to hold the smartphone. It may be appreciated that the smartphone may be held by any mechanism or combination of mechanisms (e.g., magnets, springs, clamps, or the like).

The holding arm 212b may hold the smartphone in any number of ways. In some embodiments, the holding arm 212b may include a magnetized or sticky section configured to adhere to the smartphone or smartphone case in order to hold the smartphone in position. In these embodiments, the holding arm 212b may or may not include the retaining member 216A towards the retaining member 216B for providing additional structure to holding the smartphone.

The retaining member 216A and the retaining member 216B may optionally include pads to assist in securely holding the smartphone without damaging the smartphone or the smartphone case. In some embodiments, the pads of the retaining member 216A and the retaining member 216B may be plastic, rubber, or any polymer. In some embodiments, the retaining member 216A and the retaining member 216B may include magnets to hold the edges of the smartphones, a sticky material, or a gripping material (e.g., rubber or polymer with a textured surface) for holding the smartphone.

Although many embodiments discussed herein depict a base 202 with a motor that turns either the base 202 or the rotational section 206, it may be appreciated that the motor mount 100 may not include a motor and/or can be operated manually. For example, in some embodiments, the motor mount 100 does not include a motor. The base 202 and/or a rotational section 206 may be turned manually by a user to direct the camera of the smartphone held by the retaining members 216A and 216B to different views for capturing one or more images. In some embodiments, the entire motor mount 100 may be manually turned to direct the smartphone towards different views. In other embodiments, the base 202 may be manually rotated (e.g., with ball bearings or the like) such that the motor mount 100 may maintain a position while the base 202 turns and the smartphone turns (e.g., the base 202 turns the arm member 204 and there may not be a separate rotational section 206)). In still other embodiments, the base 202 may be fixed and a rotational section 206 may be manually rotated (e.g., with ball bearings or the like) such that the motor mount 100 may maintain a position while the base 202 turns and the smartphone turns (e.g., the rotational section 206 turns the arm member 204).

Figure 3:
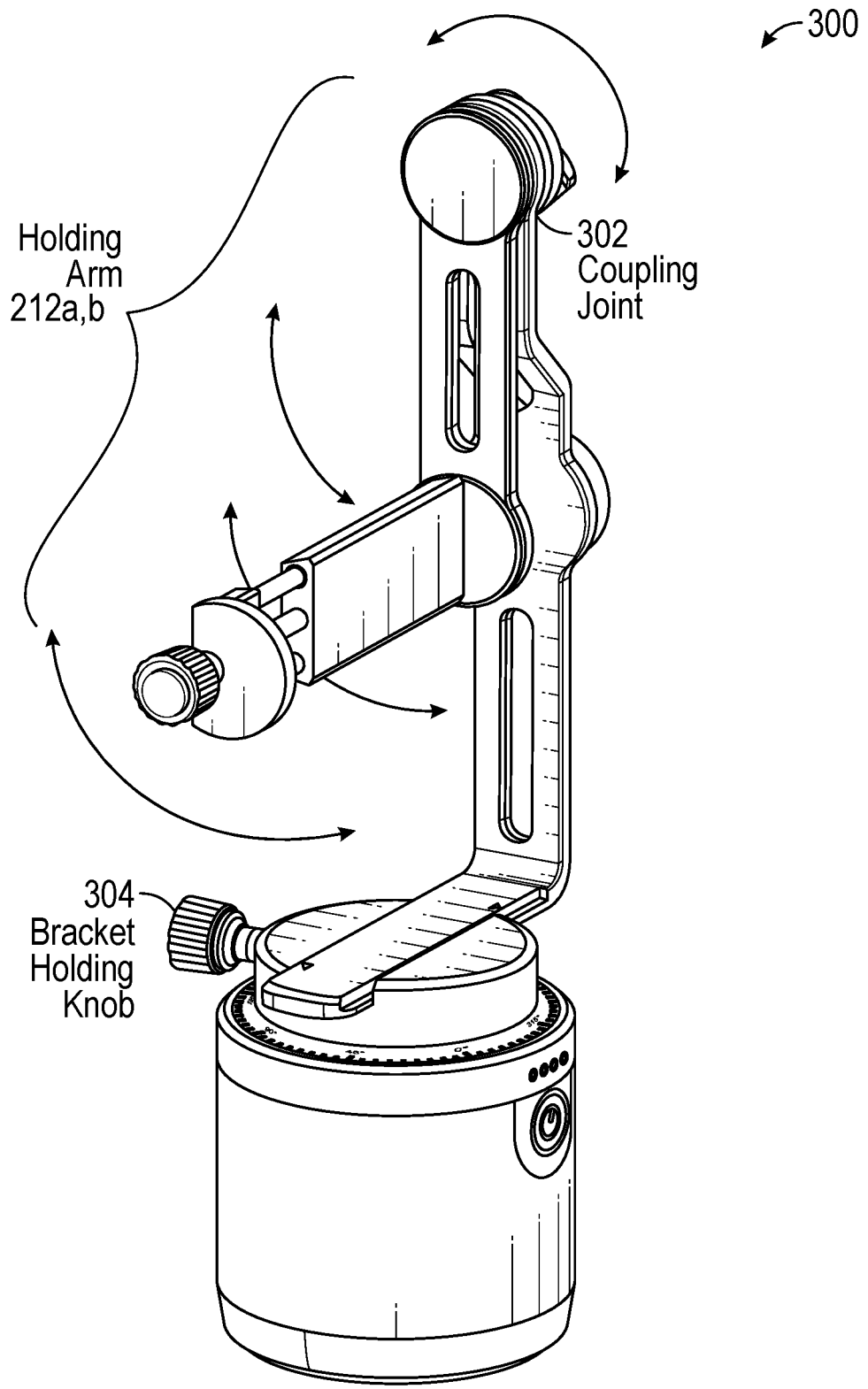
FIG. 3 is another view of the motor mount in some embodiments.

FIG. 3 is another view 300 of the motor mount 100 in some embodiments. In FIG. 3, the holding arm 212a,b of the motor mount 100 is depicted as turning to enable the smartphone held by the holding arm 212b to be adjusted at different angles. For example, once the smartphone is engaged and held by the retaining member 216A towards the retaining member 216B, the holding arm 212a,b may tilt the smartphone (e.g., by pulling, pushing or swinging the holding arm 212a,b). When a smartphone is held by the holding arm 212b, the angle of the holding arm 212a,b may be adjusted to change the angle of the field of view of the smartphone.

In various embodiments, after the smartphone is once the smartphone is engaged and held by the retaining member 216A towards the retaining member 216B, the mounting bracket 220 is positioned (e.g., along the adjustment direction) such that at least a portion of the smartphone is in the axis of rotation. The smartphone may be tilted and held in position by the holding arm 212a,b (e.g., at an angle relative to the extension 218). The camera of the smartphone may be directed with a field of view towards the environment (e.g., projected slightly upwards from the motor mount 100). The camera may also be positioned (e.g., using both the adjustment direction and the tilt of the smartphone) such that the camera (e.g., camera lens) intersects the axis of rotation to eliminate or reduce the parallax effect.

The angle of the holding arm 212a may be adjusted using coupling joint 302 that couples the holding arm 212a to the arm member 204. The holding arm 212a may be positioned at a particular angle and held in place by tightening the holding arm control knob 214. In some embodiments, the coupling joint 302 and/or the holding arm 212a may include grooves or components to position the holding arm 212a at predetermined positions (that are common angles for all or a majority of smartphones).

Figure 11:
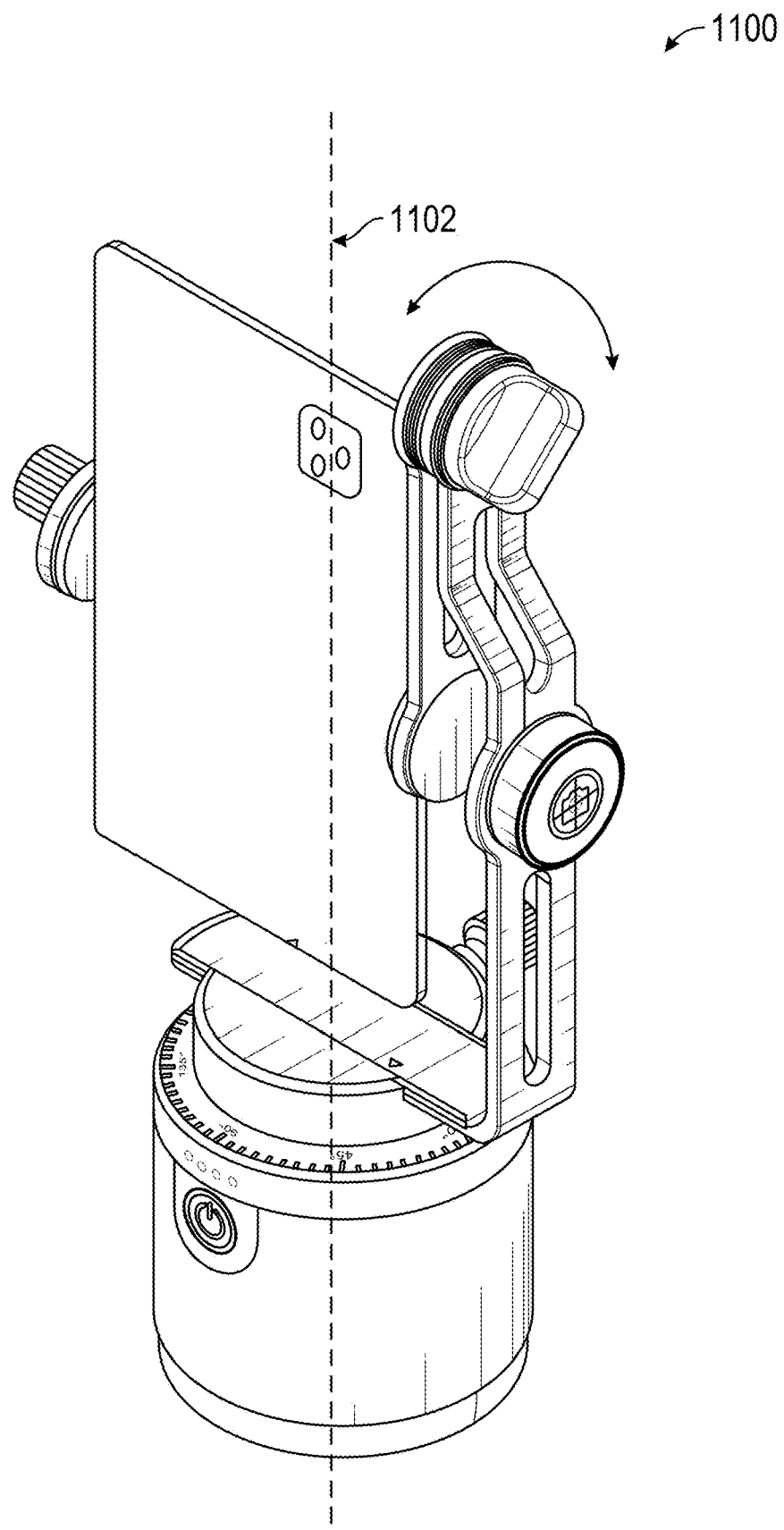
FIG. 11 depicts a perspective view of motor mount holding a smartphone in some embodiments.

In various embodiments, there is a motor within the base 202 configured to rotate all or part of the base 202. In the example of FIG. 3, a rotational section 206 is coupled to the motor within the base 202. The motor may rotate the rotational section 206 about an axis of rotation. FIG. 11 depicts a perspective view 1100 with an axis of rotation 1102 in some embodiments. The rotational section 206 may be a flat disk or be any shape.

It will be appreciated that the base 202 may be cylindrical (as depicted in FIG. 2) or any shape (e.g., box, ovoid, or the like). The base 202 may include a motor for turning an arm (e.g., arm member 204 and/or holding arm 212a,b) about the axis of rotation.

In various embodiments, a smartphone may be coupled to the holding arm 212b (e.g., using the retention adjustment member 210 to tighten the edges of the smartphone using holding arm 212b). Once tightened to hold onto the smartphone, the holding arm 212b may be adjusted such that the field of view of the camera of the smartphone is directed in the desired direction for capturing images about the motor mount 100. In some embodiments, an application on the smartphone (discussed further herein) may provide guidance as to when the desired angle is achieved.

Once in the desired angle (e.g., at the desired angle by adjusting the angle of the holding arm 212a), the user may tighten and hold the angle of the holding arm 212a by tightening the holding arm control knob 214. After images are taken, the user may optionally untighten the holding arm control knob 214 to return the holding arm 212a to a neutral position (e.g., with a section of the holding arm 212a being parallel to the arm member 204).

In some embodiments, once the smartphone is held by the holding arm 212b, the arm member 204 may be adjusted to position the camera of the smartphone at the no parallax point. For example, arm member 204 (which holds the holding arm 212a,b) may be slid (e.g., in the adjustment direction) until the camera of the smartphone is directly above the turning axis of the motor of the base 202 (e.g., along the vertical axis of rotation).

In some embodiments, the angle of the smartphone retained by the holding arm 212b may be adjusted manually by a user by swinging the holding arm 212a,b into a tilted position and tightening the holding arm control knob 214. In various embodiments, a motor (e.g., at the coupling joint 302) may automatically move the holding arm 212a,b into a position such that the angle of the lens of the smartphone is at the desired position. Once the holding arm 212a,b is moved to the appropriate angle, the motor or retaining member may hold the smartphone at the desired angle while capturing images and being turned by the motor of the base 202. In some embodiments, after automatically adjusting the angle of the smartphone, a user may manually tighten the holding arm control knob 214.

The holding arm control knob 214 may be a screw that tightens the coupling joint 302 such that the holding arm 212a,b is no longer able to change based on the weight of the smartphone. In various embodiments, the coupling joint 302 includes a material (e.g., soft, rubber, or elastomer) such that the actuation device (e.g., screw) of the holding arm control knob 214 does not provide wear out the coupling joint 302 or cause the coupling joint 302 to deteriorate such that the desired angle of the smartphone can no longer be retained.

In some embodiments, the holding arm control knob 214 includes one or more screws to hold the holding arm 212a at the desired position. In various embodiments, the holding arm control knob 214 includes magnets that may be repositioned to hold the angle of the holding arm 212a. In one example, a user may pull the holding arm control knob 214 to pull an opposing magnet away from a series of magnets at radial positions along the coupling joint 302 until the desired angle (e.g., between the holding arm 212a and the extension 218 of the arm member 204) is obtained and then pushing or allowing the opposing magnet to move (e.g., by a spring to push the magnet back into place) in proximity with an opposing magnet to hold the position of the holding arm 212a.

It will be appreciated that many different smartphones from many different manufacturers may be held by the motor mount 100. For example, the retention adjustment member 210 may be adjusted to hold different smartphones with different widths. Similarly, the arm member 204 may be adjusted by sliding across the rotational section (e.g., via the sliding section 208) to position the camera of many different smartphones. For example, a smartphone may be an Iphone or Android Phone.

FIG. 3 is another view 300 of the motor mount 100 in some embodiments. In this example, the direction of pivot or swing to tilt the smartphone is depicted. The holding arm 212a may be coupled to the extension 218 by the coupling joint 302. The holding arm 212a may be configured to be tiled or adjusted about an axis at the coupling joint 302.

It may be appreciated that the arm member 204 is movably coupled to the rotational section 206 and the holding arm 212a,b may be tilted to position and hold the camera of the smartphone retained by the holding arm 212b at the axis of rotation of the motor of the base 202. The position of the camera at the axis of rotation of the motor of the base 202 may reduce or eliminate parallax error. Further, the arm member 204 and the holding arm 212a,b may be adjusted to position and hold the camera of the smartphone retained by the holding arm 212b at the axis of rotation of the motor of the base 202 during movement (e.g., turning) of the smartphone.

The bracket holding knob 304 may allow for the mounting bracket to be held at a particular position relative to the rotational section 206. In various embodiments, the bracket holding knob 304 (e.g., adjustable component) includes a screw for applying pressure to the edges of the sliding section 208 (or movable component that movably couples the mounting bracket 220 to the rotational section 206).

There may be many ways to hold the mounting bracket 220 at a desired position at the rotational section 206. In some embodiments, there may be a motor configured to position and hold the mounting bracket 220 at the rotational section 206. In various embodiments, there may be a peg to slide into a recess (e.g., either a long groove along the side of the sliding section 208 or a plurality of recesses along the side of the sliding section 208). In a different example, there may be one or more magnets configured to hold the mounting bracket 220 relative to the rotational section 206.

In any of these examples, it will be appreciated that the mounting bracket 220 may be held in a position adjusted by the user. The holding force may be sufficient to keep the mounting bracket 220 in the selected position (e.g., relative to the rotational section) when the smartphone is coupled to the holding arm 212b (e.g., holding member), the tilt of the holding arm 212a,b is adjusted, and the motor of the base 202 is moving the smartphone during operation.

FIG. 4 is a back, perspective view 400 of the motor mount depicting the base 202 and the mounting bracket 440 in some embodiments. In some embodiments, the base 202 is cylindrical and houses a motor, battery, communication module, and processor.

The mounting bracket 220 may include components of the motor mount 100 that do not include the base 202 and the rotational section 206. In this example, the mounting bracket 220 includes the sliding section 208 and the extension 218 (e.g., the arm member 204), the holding arm control knob 214, the holding arm 212a, the retention adjustment member 210, the holding arm 212b, the retaining member 216A, and the retaining member 216B.

Figure 5:
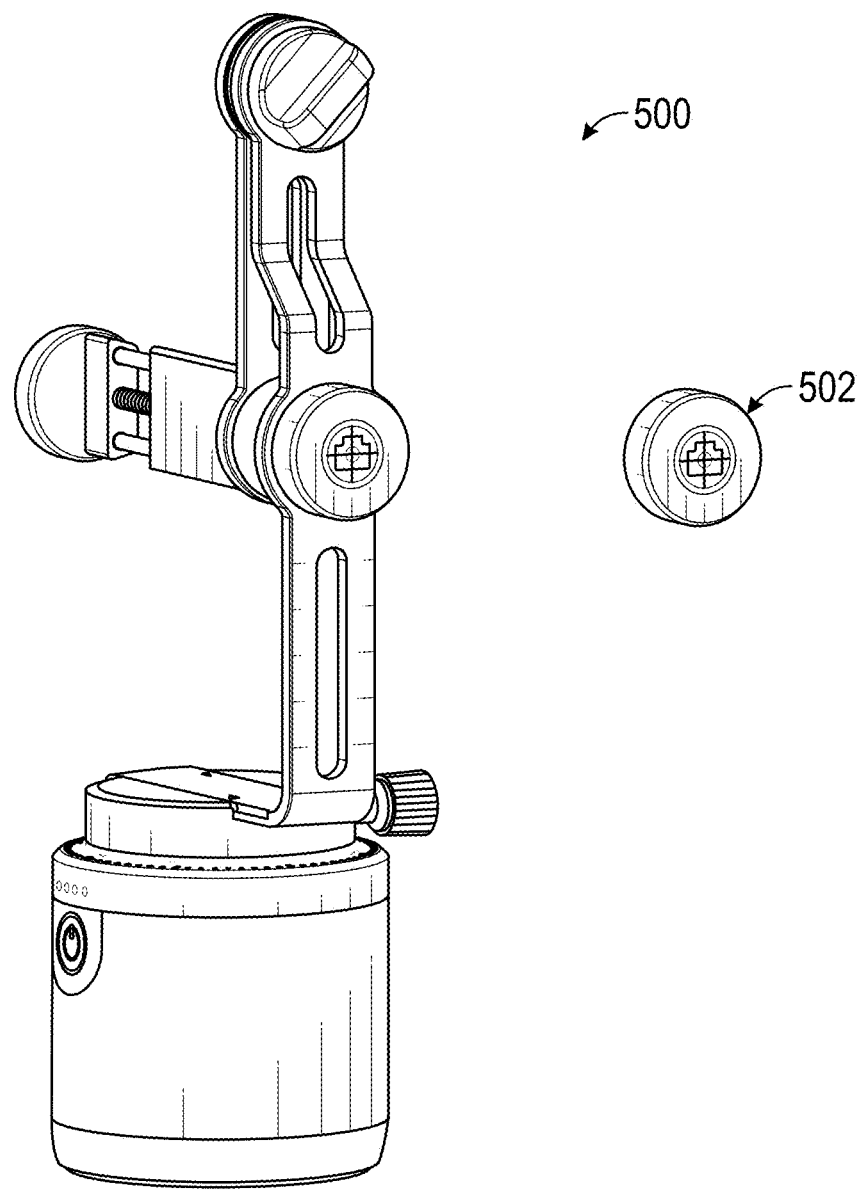
FIG. 5 depicts a perspective, right side view of the motor mount and the activation button in some embodiments.

FIG. 5 depicts a perspective, right side view 500 of the motor mount 100 and the activation button 502 in some embodiments. The optional activation button 502 may be removable from the arm member 204. In one example, the activation button 502 may be held to the arm member 204 by a magnet (e.g., rare earth element magnet). In some embodiments, the optional activation button 502 may be held in place by a pin and groove (e.g., a pin on the activation button 502 fits into an optional groove of the arm member 204 and is held in place).

While the figures show the activation button 502 on the outside of the arm member 204, it will be appreciated that the activation button 502 may be positioned in different parts of the arm member 204 and/or holding arm 212a,b. In one example, the activation button 502 may be positioned on the opposite side of the arm member 204 between the arm member 204 and the holding arm 212a,b.

The activation button 502 may include a battery and a wireless communication module to communicate with the motor mount 100. The wireless communication module may support Bluetooth communication, WIFI, Zigbee, and/or any other wireless communication protocols. In one example, the activation button 502 may include a Bluetooth communication device to indicate to the motor mount 100 when the activation button 502 is actuated. In various embodiments, the activation button 502 may be actuated by depressing the activation button 502, by providing a verbal command, and/or the like. In some embodiments, the activation button 502 is paired to the base 202 and/or a smartphone.

The battery of the activation button 502 be removable or rechargeable. For example, the base 202 may recharge the battery of the activation button 502 when positioned on the arm member 204. In one example, the battery of the activation button 502 may be recharged through wires that run from the battery in the base 202 along or inside the arm member 204 to the activation button 502. In some embodiments, when the battery of the base 202 is recharged, the battery in the activation button 502 is also recharged. In some embodiments, the battery of the activation button 502 may be recharged by plugging a cable (e.g., USB cable) from a power source into the activation button 502 or placing the activation button 502 on a wireless recharging device (e.g., wireless recharging mat) for wireless recharging.

The activation button 502 may allow the smartphone to capture images and movement of the motor mount 100 without requiring the user to touch the motor mount 100. It may be appreciated that vibration or changes in position caused by touch may alter the quality of image capture or change the direction of the field of view of the camera of the smartphone. The activation button 502 may allow the user to begin the process (e.g., image capture and/or turning of the motor mount) by activating the activation button 502

Figure 6:
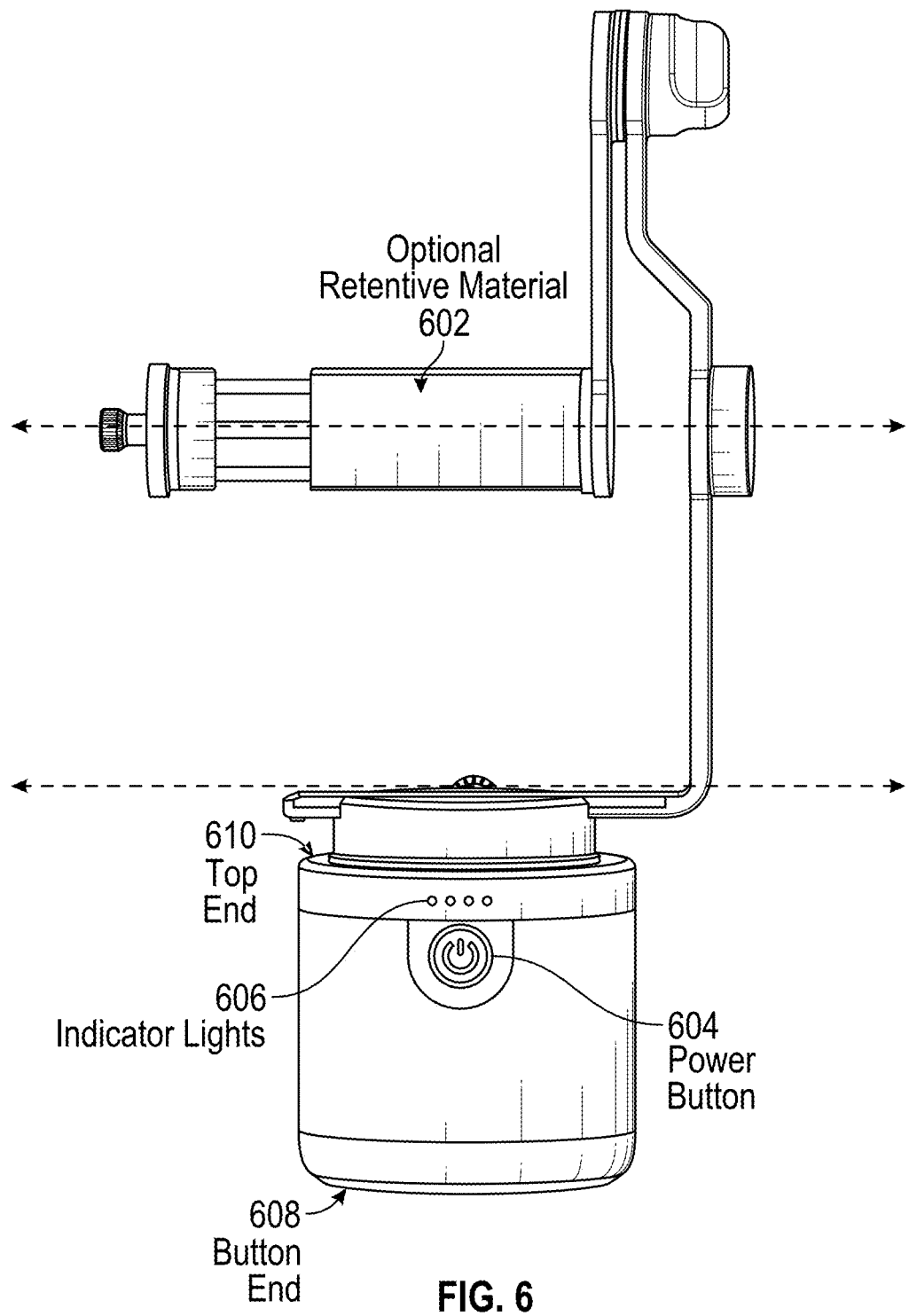
FIG. 6 depicts a frontal view of the motor mount including an optional retentive material.

In various embodiments, after the smartphone is held and positioned using the motor mount 100, the user may activate the motor mount 100 by depressing the power button 604 (see FIG. 6). The user may remove the activation button 502 from the motor mount 100 and, when ready (e.g., out of the environment or outside the field of view of the camera), activate the activation button 502. The activation button 502 may provide a signal to the motor mount 100 to pause a predetermined period of time (e.g., to allow images to be captured by the smartphone) and then turn the smartphone using the motor of the base 202 before pausing again to allow new images to be captured. The process may continue (e.g., moving then pausing) until the images from the different positions are captured.

In some embodiments, the activation button 502 may provide a signal to the motor mount 100 to turn the smartphone to a first position and then pause for the predetermined period of time (e.g., to allow images to be captured by the smartphone). Subsequently and then turning the smartphone using the motor of the base 202 before pausing again to allow new images to be captured. The process may continue (e.g., moving then pausing) until the images from the different positions are captured.

In some embodiments, the smartphone may receive the signal from the actuation of the activation button 502. For example, the smartphone may be paired or otherwise configured to communicate with the activation button 502 (e.g., via Bluetooth or WIFI). The smartphone may include an application that is configured to take images around an environment (e.g., the MATTERPORT CAPTURE app). The smartphone may receive the signal from the activation button 502 and begin the image capture process. In one example, the smartphone may receive the signal, and the application may initiate capture of one or more images of the environment before pausing to allow the motor mount 100 to turn the smartphone in a new direction. The smartphone may then capture one or more images from the new direction before pausing to allow the motor mount 100 to move the smartphone again. The process may continue until one or more images are captured of the environment around the motor mount 100 at the different directions.

In some embodiments, the holding arm 212b includes a magnet to hold the smartphone in addition to or instead of applying pressure to the edges of the smartphone to retain a grip (in addition or instead of using the retaining member 216A and the retaining member 216B to hold the smartphone). FIG. 6 depicts a frontal view of the motor mount 100 including an optional retentive material 602. In this example, the retention adjustment member 210 may not slide horizontally (e.g., horizontally relative to the base). In some embodiments, the optional retentive material 602 may include a material that is sticky or enables a grip (e.g., rubber or polymer with a textured surface) for holding the smartphone. In some embodiments, the motor mount 100 may include the optional retentive material 602 on the holding arm 212b and/or a retention adjustment member 210 capable of moving towards the smartphone for improved hold.

In some embodiments, the direction of movement (e.g., direction of adjustment) of the mounting bracket 220 to the rotational section 206 is along a line in the place of rotation of the rotational section 206. In other embodiments, the mounting bracket 220 may be moved in any direction relative to the rotational section 206.

As discussed herein the direction of movement of the retention adjustment member 210 is to open and close the retaining member 216A and the retaining member 216B. The direction of movement of the retention adjustment member 210 may be parallel to the direction of movement of the mounting bracket to the rotational section 206 as depicted in FIG. 6.

The base 202 may include a bottom end 608 and a top end 610. The top end 610 may be the rotational section 206 or, alternately, coupled to the rotational section 206. The rotational section 206 may be a housing of the base, or a platform coupled to a motor of the base 202 and configured to be turned to turn the mounting bracket 220.

The power button 604 may control power (e.g., from the battery of the base) and may activate or deactivate the base 202. The base 202 may optionally include indicator lights 606 indicating when the base is turned off or turned off. In some embodiments, the indicator lights 606 may indicate when the base 202 is paired with the activation button 502 and/or the smartphone.

FIG. 7 depicts a top perspective view of the base 202 in some embodiments. The top of the base 202 may include a depressed area for sliding the sliding section 208. The depressed area may be within the rotational section 206. The rotational section 206 may also include an optional groove 704. In various embodiments, the sliding section 208 may include a nodule that fits within the optional groove 704 to keep the mounting bracket 220 from sliding across and out of the depressed area and off the base 202. It will be appreciated that there may be many mechanisms for keeping the mounting bracket 220 from accidentally decoupling from the base 202. In some embodiments, there are no mechanisms for keeping the mounting bracket 220 from accidentally decoupling from the base 202.

The rotational section 206 may also include a slot 702 that may enable a retaining member to be pushed into the depressed area to apply tension to the sliding section 208 to keep the mounting bracket 220 from moving once in position. In some embodiments, the bracket holding knob 304 may be linked to a screw and/or the retaining member and may push or pull the retraining member through the slot 702 to tighten the position of the sliding section 208 within the depressed area.

FIG. 7 further depicts that the rotational section 206 may rotate in a clockwise direction.

Figure 8:
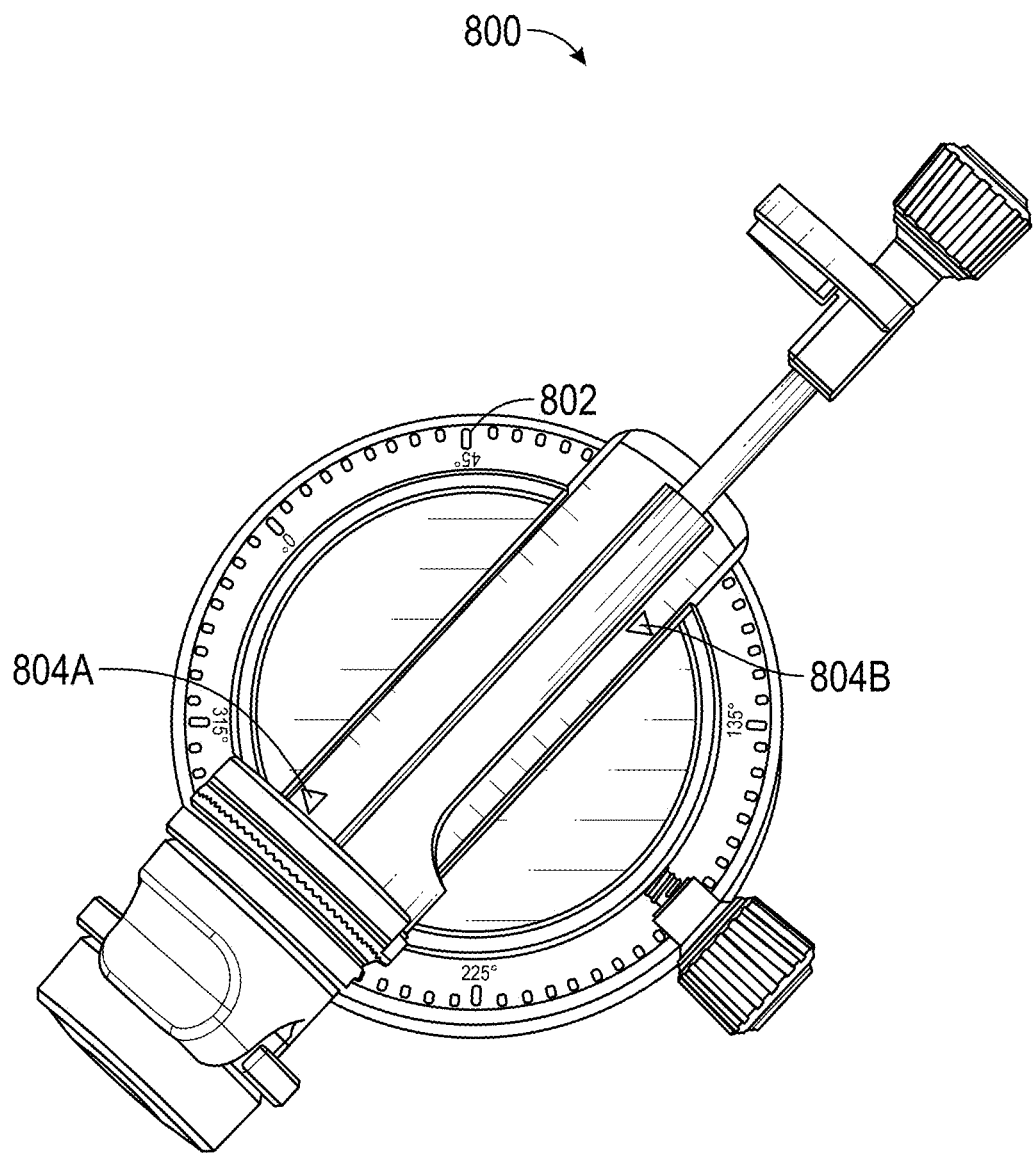
FIG. 8 depicts a top view of the motor mount in some embodiments.

FIG. 8 depicts a top view 800 of the motor mount 100 in some embodiments. In some embodiments, the motor mount 100 includes indications to assist the user to position the camera or a smartphone over the axis of rotation. In some embodiments, the rotational section 206 and/or the top of the base 202 may include rotational indications 802 to indicate degree of rotation. The rotational section 206 may also include a circular portion to enable alignment of the smartphone.

In various embodiments, the sliding section 208 may include indications 804A and 804B (e.g., arrows) that may align with a part of the top end of the base 202 and/or rotational section 206.

Figure 9:
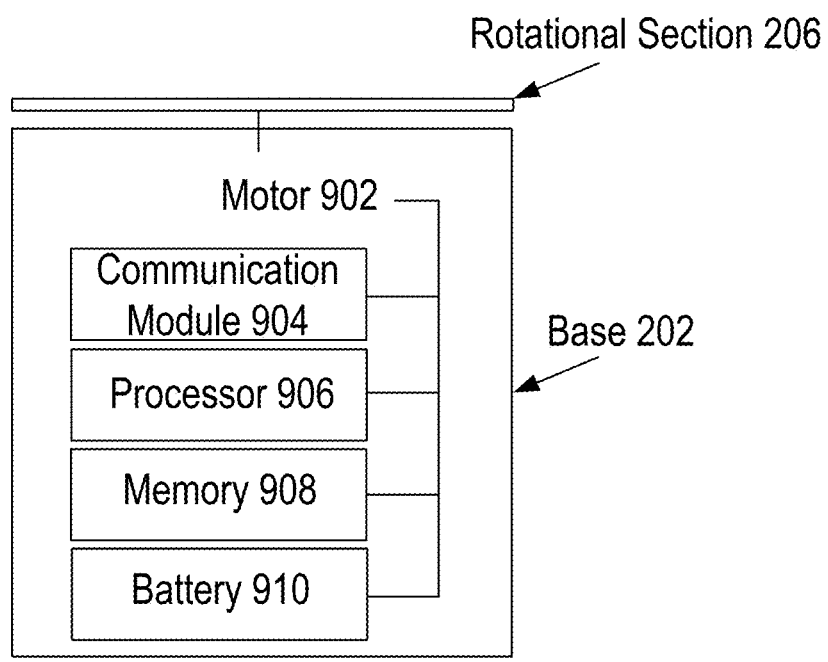
FIG. 9 is a block image of a base in some embodiments.

FIG. 9 is a block image of a base 202 in some embodiments. The base 202 may include a motor 902, a communication module 904, a processor 906, memory 908, and a battery 910. The base 202 may include a motor 902 such as a brushless motor for rotating the rotational section 206. The motor 902 is coupled to the rotational section 206 at a point that may be at the axis of rotation. In various embodiments, the motor 902 may turn a housing of the base 202 rather than a rotational section 206 which is depicted as a separate component from the base 202. If the motor 902 turns the housing, then there may not be a rotational section 206.

The motor 902 may receive power from the battery 910.

The communication module 904 may include a receiver and/or transmitter (e.g., a transceiver) for receiving and/or transmitting signals. In some examples, the communication module 904 may enable communication via Bluetooth, WIFI, Zigbee, and/or any other standards. A module may be hardware (e.g., an ASIC), software (e.g., contained all or in part in memory 908), or both.

The processor 906 is configured to execute executable instructions (e.g., programs). In some embodiments, the processor 906 comprises circuitry or any processor capable of processing the executable instructions.

The memory 908 stores data. Some examples of memory 908 include storage devices, such as RAM, ROM, RAM cache, virtual memory, etc. In various embodiments, working data is stored within memory 908. The data within memory 908 may be cleared or ultimately transferred to storage (e.g., hard drive or FLASH memory that is not depicted in FIG. 9).

The base 202 may also include one or more batteries 910 to power the rotational section 206. In some embodiments, one or more batteries 910 (e.g., lithium or polymer batteries) may be charged by coupling the base 202 with a charging cable (e.g., a USB cable) coupled to a power supply. In some embodiments, the base 202 may include a compartment for batteries 910 (e.g., double A batteries).

These program stored in memory 908 and/or storage may include instructions executable by the processor 906. The instructions may include operational commands for managing the communication module 904, activating the motor 902, deactivating the motor 902, receiving or transmitting signals, decoding signals, and/or performing other functions (e.g., by the processor 906). The storage may include a non-transitory computer readable medium that stores information to be loaded into memory 908 for processing. The storage may include a hard drive or flash drive.

Figure 10:
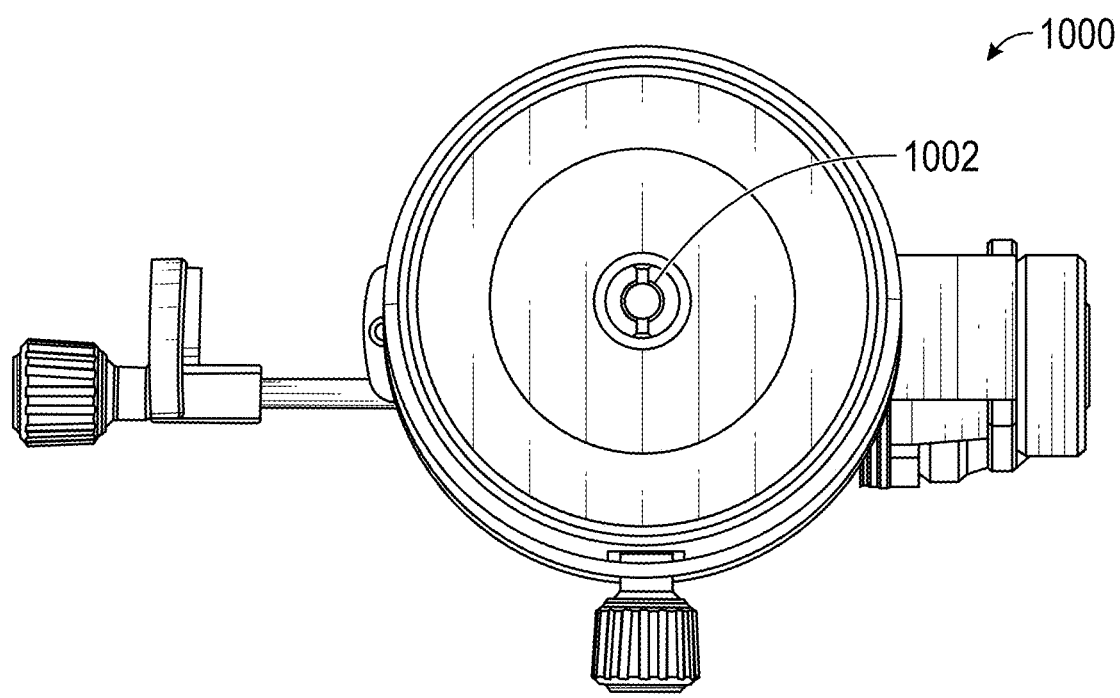
FIG. 10 depicts a bottom view of the bottom end of the motor mount in some embodiments.

FIG. 10 depicts a bottom view 1000 of the bottom end of the motor mount 100 in some embodiments. The coupler 1002 may be a socket that allows for the motor mount 100 to be coupled to a mount or other stabilizing device.

FIG. 11 depicts a perspective view 1100 of motor mount 100 holding a smartphone in some embodiments. The smartphone may be held by the holding arm 212*b* (e.g., in between the retaining member 216A and the retaining member 216B). The smartphone may be held in position by the mounting bracket 220. For example, the camera of the smartphone may intersect with the axis of rotation 1102 of the base 202.

The smartphone may be tilted by the holding arm 212*a,b* using the coupling joint 302 such that the field of view of the camera is directed forward and upwards towards the environment around the base 202. It may be appreciated that after tiling the smartphone, the camera may intersect with the axis of rotation 1102 to reduce or eliminate parallax error.

Although FIG. 11 depicts the camera of the smartphone on one side of the smartphone, it will be appreciated that any smartphone may be placed in the holding arm 212*b* backwards (e.g., screen facing out) or forwards (e.g., screen facing in towards the holding arm 212*b*). In some embodiments, if the screen of the smartphone is facing towards the holding arm 212*b*, the application discussed herein may be configured to provide controls for the user in positions around any obstructions of the holding arm 212*b* (e.g., by designing the interface such that controls or important information do not display in an area that may be obstructed by the holding arm 212*b*). In some embodiments, the smartphone may detect the base 202 (e.g., via Bluetooth pairing, NFC chip, or the like) and the application may be configured to adjust positioning of information and controls in the smartphone interface around possible obstruction by the holding arm 212*b*.

In various embodiments, the smartphone may be positioned such that the camera of the smartphone remains in the no-parallax point. When angled, the smartphone may be adjusted to slide upwards or downwards in the bracket such that the camera remains in the no-parallax point (e.g., along the axis of rotation 1102) when the smartphone is tilted.

Figure 12:
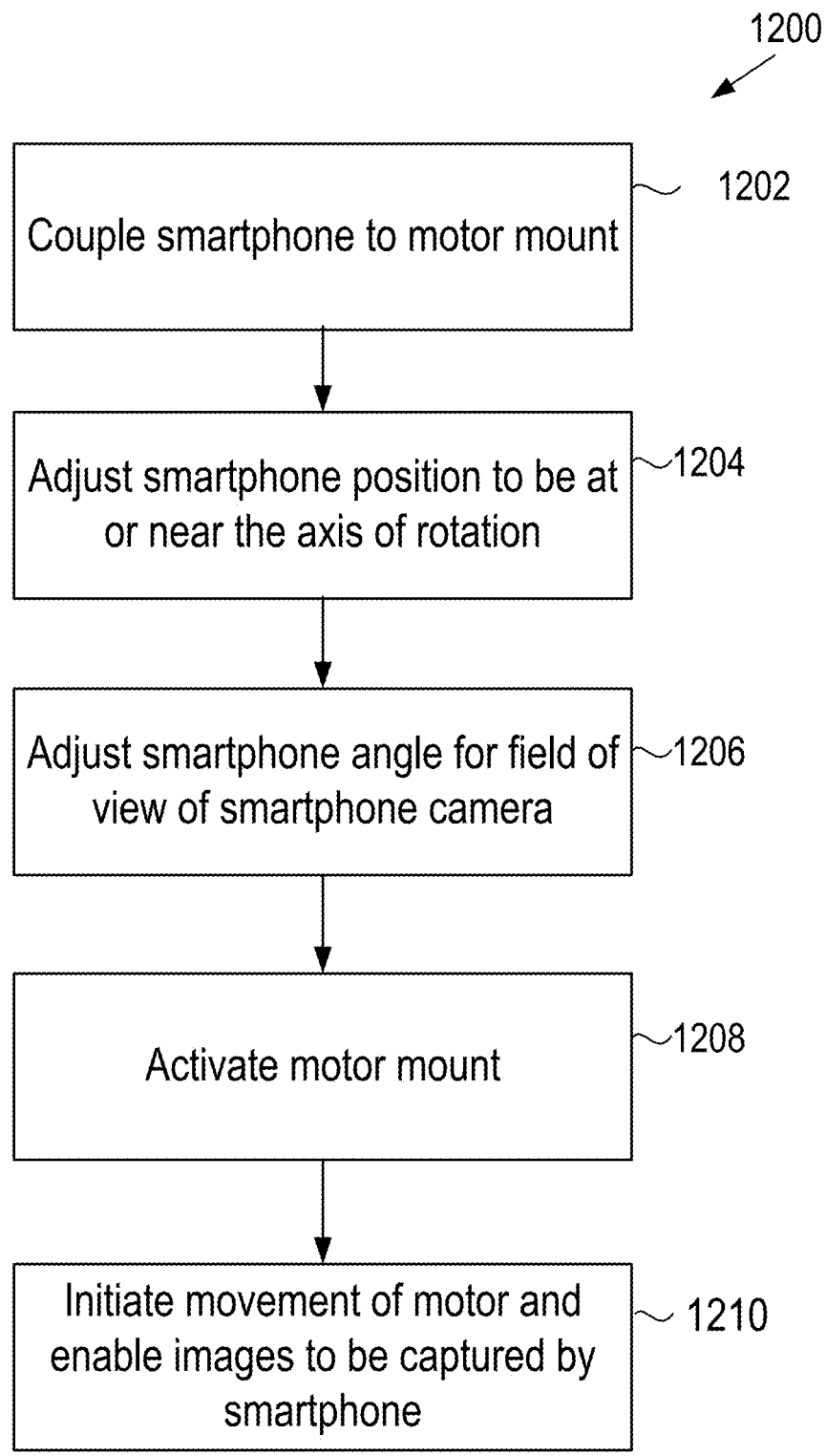
FIG. 12 is a flowchart for using the motor mount and a smartphone in some embodiments.

FIG. 12 is a flowchart 1200 for using the motor mount 100 and a smartphone in some embodiments.

In step 1202, the smartphone may be coupled to the motor mount 100. In various embodiments, the smartphone may be coupled to the holding arm 212*b* by pinching the sides of the motor mount with retaining member 216A and retaining member 216B and being optionally supported by a member of the holding arm 212*b*. In some embodiments, the smartphone may be held in place by a magnet or other coupling device.

In step 1204, the smartphone is adjusted to a position such that the camera of the smartphone is at or near the axis of rotation. In some embodiments, the mounting bracket 220 is adjusted to move the smartphone across the rotational section 206 such that the smartphone is aligned or near the axis of rotation. For example, the sliding section 208 may be slid across the rotational section 206 until in position and the then the position locked or tightened.

In step 1206, the smartphone is tilted using the holding arm 212*a,b* and the coupling joint that allows the holding arm 212*b* to swing or be positioned at a tilted position that enables a desired field of view of the camera. The holding arm control knob 214 may hold the holding arm 212*a,b* at the desired position when the position is attained. The angle of tilt may be an angle of the holding arm 212*a,b* relative to the extension 218. Once tilted, the smartphone may be adjusted (e.g., by moving the sliding section of the mounting bracket 220 to adjust or readjust the position of the smartphone) such that the camera is at or intercepts the axis of rotation.

It will be appreciated that steps 1204 and 1206 may be reversed (e.g., the smartphone tilt is adjusted and fixed before the mounting bracket 220 is adjusted at a particular position (e.g., adjusted within or across the rotational section 206).

In step 1208, the motor mount may be activated (e.g., by pressing a button on the base 202).

In step 1210, the process of capturing images by the smartphone and moving the smartphone by the motor mount 100 at different directions is initiated.

The smartphone may be any phone or communication device that includes a camera. The smartphone may include software (e.g., an application) configured to take images of a surrounding environment. In some embodiments, the application is the MATTERPORT CAPTURE application. The application may be configured to provide guidance to the user to position the smartphone between capturing sets of images such that the field of view for each set of images is in a preferred location. For example, the application may provide guidance to the user to hold the smartphone in a particular position and then take one or more images. The application may then provide guidance to the user to move and/or turn the smartphone in a new direction before taking new images in the new direction. In various embodiments, the application may retrieve sensor readings from the smartphone (e.g., from a gyroscope and/or compass) to position the smartphone in a preferred direction and position the smartphone such that the field of view of the camera is in a desired position. The application may provide the user with directions to position the smartphone and/or field of view (e.g., by depicting a ball to be aligned with a target or region on a screen and then changing the display to indicate when the phone is in a proper position or is close to the proper location).

In various embodiments, the application may be triggered to take images by the user (e.g., by depressing a control button depicted by the application on the screen of the smartphone). The application may then provide guidance to the user to reposition the smartphone to a new direction in the environment. The user may actuate the activation button 502 to send an initiation signal to the base 202 to turn the rotational section 206 (and the smartphone) in the new direction. Because the smartphone will be direct to the correct location by the motor and is held at the correct angle by the holding arm 212a,b, the application may determine that the smartphone is in the right position and may automatically take one or more images in the new direction. The base may pause a predetermined period to allow the application to take images before turning into a new position. Alternately, the user may again actuate the activation button 502 to send another signal to initiate turning of the smartphone to a new direction and the process may repeat until the application has taken one or more images at the needed positions.

It will be appreciated that the activation button 502 is optional. In some embodiments, the user may depress the power button 604 (e.g., quickly) to initiate turning of the smartphone by the base 202. After which, the base may automatically pause to allow the smartphone to take images before automatically turning and then pausing until the smartphone has had the opportunity to take images at the different positions. In other embodiments, the user may depress the power button 604 to initiate each turn.

In some embodiments, the application may control the base 202. In one example, the user may depress a button provided by the application on the screen of the smartphone to initiate taking images. The application may trigger capturing of one or more images and then the application may provide a signal to the base 202 to activate the motor to turn the smartphone in the new direction. The base 202 may turn the rotational section 206 and/or smartphone a predetermined number of degrees (or a number of degrees provided by the smartphone to the base 202) before stopping. The application may trigger capturing of one or more images in the new direction and then the application may provide another signal to the base 202 to activate the motor to turn the smartphone in another new direction. The base 202 may turn the rotational section 206 and/or smartphone the predetermined number of degrees (or a number of degrees provided by the smartphone to the base 202) before stopping.

In some embodiments, the application may communicate with the base 202. In various embodiments, the motor mount 100 includes a Bluetooth component (e.g., within the base 202) that can be paired with the smartphone. The smartphone may connect with the motor mount 100 using Bluetooth (or another wireless protocol such as NFC, WIFI, Zigbee, and/or the like). Once paired and the base is activated (e.g., through pressing the power button 604 and/or the activation button 502), the base may provide a signal to the application that the process has begun. In response, the application may trigger the capturing of one or more images (e.g., using the camera of the smartphone) and then pausing to allow the motor mount 100 to turn the smartphone. In some embodiments, the application may engage the process for repositioning and aligning the smartphone, however, since the smartphone is being held in a stable position and is turned in a fixed direction, the application may determine that the smartphone is in the correct position (e.g., direction and field of view are correct) and the application may automatically take one or more pictures. The process may continue until pictures are taken in the desired positions as directed by the motor mount 100.

In some embodiments, the application on the smartphone may wait until it receives a signal from the activation button 502 or the base 202 (e.g., which provides a signal to the application when it receives a signal for the activation button 502) to trigger one or more images to be taken in the new direction before the base 202 moves to a new position.

The base 202 may turn the smartphone in a new direction after pauses of predetermined duration. For example, the base 202 may turn the smartphone and pause for five seconds and then automatically turn the smartphone to a new direction and, again, pausing for the same duration. The base 202 may repeat the cycle of turning and pausing until the smartphone is turned a predetermined numbed of degrees (e.g., 270 degrees, 360 degrees, 300 degrees, or the like) is reached. It will be appreciated that the motor mount 100 may stop turning the smartphone before turning the smartphone a full 360 degrees if the smartphone initiated capturing images before being turned by the motor mount 100.

In some embodiments, the application may identify the motor mount 100 through wireless communication (e.g., Bluetooth pairing) and/or receive a motor mount identifier. The motor mount identifier may indicate the model or type of motor mount (e.g., there may be different motor mounts with different sizes for arm member 204 and/or rotational sections 206). The application may retrieve a smartphone identifier (e.g., from the operating system or provided by the user) and retrieve a profile from a set of profiles. Each profile may include configurations associated with the type of smartphone and/or type of motor mount 100. The smartphone may utilize the profile to provide guidance to the user (e.g., through an interface on the screen) regarding positioning the smartphone in relation to the motor mount 100 and provide onscreen indications when the position of the smartphone is correct (e.g., the camera of the smartphone is at the no parallax point and the smartphone is angled correctly). In some embodiments, the smartphone may utilize the profile to control one or more automated motors of the motor mount 100 to hold the smartphone, angle the smartphone, and/or position the camera at the no-parallax point. In various embodiments, the smartphone may utilize the profile to control one or more motors of the motor mount 100 and provide guidance to the user for manual adjustments.

In some embodiments, the base 202 or any part of the motor mount 100 may include a processor and memory. The memory may include instructions to cause the motor mount 100 to communicate with the smartphone (e.g., over a wireless component as discussed herein) and/or the application on the smartphone. In various embodiments, the motor mount 100 may retrieve a smartphone identifier or a profile identifier. For example, the motor mount 100 may provide a query to the smartphone or application on the smartphone. The application or smartphone (e.g., operating system on the smartphone) may provide a phone identifier to indicate the type of smartphone (e.g., model of smartphone) or a profile identifier. The motor mount 100 may retrieve or receive a profile of a plurality of profiles. Each profile may be associated with one or more different smartphones. The motor mount 100 may provide instructions to one or more different motors to control a position of the arm member 204 to automatically move the arm member 204 such that the camera of the smartphone is positioned at the no parallax point. In some embodiments, the motor mount 100 may provide audio instructions to the user to control the position of the arm member 204 to automatically move the arm member 204 such that the camera of the smartphone is positioned at the no parallax point. Similarly, the profile may include instructions to the user or automatically move (e.g., through a servomechanism) the holding arm 212a,b to position the smartphone at the right angle for a desired field of view.

In various embodiments, the base 202 includes an encoder that enables improved rotational accuracy. In one example, the base 202 includes an encoder (e.g., in communication with the motor) that may allow for feedback to the smartphone. In this example, the encoder may control rotation at greater accuracy and track movement.

The base 202 may further share measurements and/or commands with the smartphone (e.g., via a smartphone application) to allow improvements of stitching tolerance and improved accuracy of photoimagery. For example, the smartphone application may be configured to communicate with the base 202 (e.g., via Bluetooth, WIFI, Zigbee, or any other wireless communication). The smartphone application may control movement and/or receive movement metrics (e.g., measurements) to assist in capturing images at specific locations of the environment. This improvement in position may assist in precise capture of portions of the environment. Further, these improvements in image capture can assist in stitching the images together for improved 3D conversion.

Figure 13:
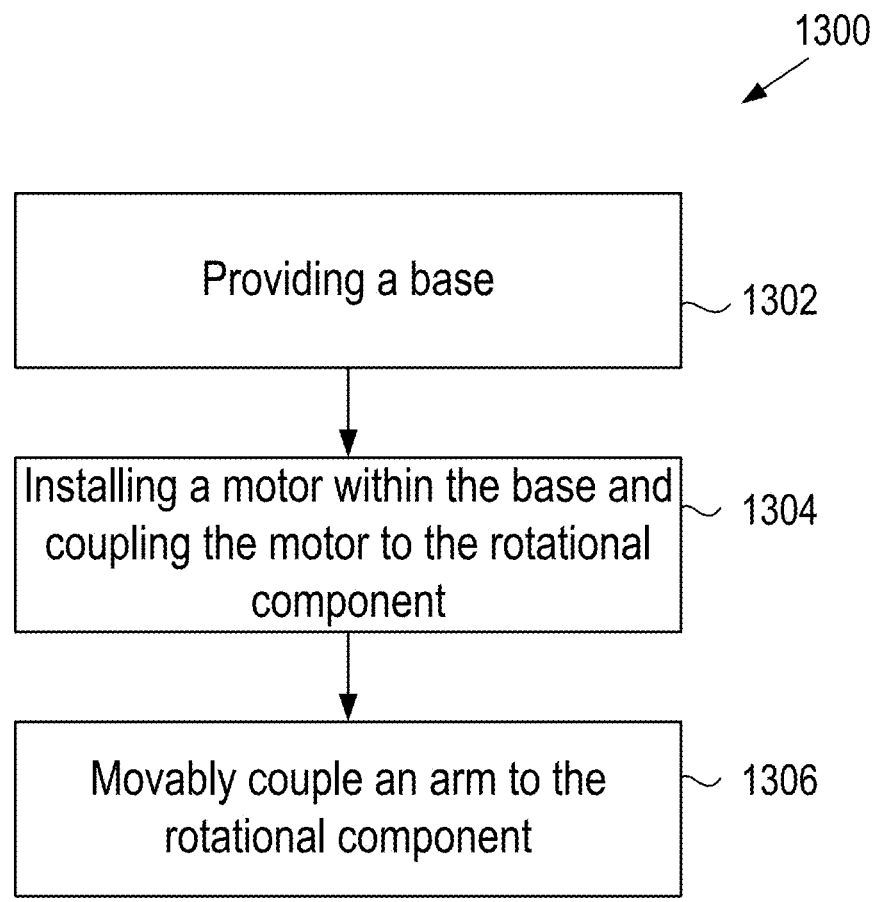
FIG. 13 is a flowchart for building a motor mount in some embodiments.

FIG. 13 is a flowchart 1300 for building a motor mount 100 in some embodiments. In step 1302, a base with a bottom end and a top end opposite the bottom end is provided.

In step 1304, a motor may be installed within the base. The motor may be coupled to a rotational component of the base. The rotational component of the base may be a rotational section 206 or a part of the base 202. The motor may be configured to turn the rotational component about an axis of rotation. The rotational component may be at the top end of the base. The axis of rotation of the rotational component is perpendicular to the top end of the base.

In step 1306, the arm is movably coupled to the rotational component. In one example, the mounting bracket 220 is movably coupled to the base 202 or the rotational section 206 such that the mounting bracket 220 may be positioned and held in a particular place by a user (e.g., the place may change depending on need or device to be held by the motor mount 100). In some embodiments, at least a portion of the arm may be capable of moving about the axis of rotation (e.g., the extension 218 may be parallel to the axis of rotation and may move about the axis of rotation when the motor turns the rotational section 206. The arm (e.g., mounting bracket 220) may include at least one holding member (e.g., holding arm 212b) above the top of the base 202 for holding a digital device above the top of the base 202. The arm (e.g., mounting bracket 220) may be adjusted to move the holding member over the rotational component. The rotational component may be capable of turning the arm (e.g., rotating the mounting bracket 220 by turning the rotational section 206). The arm may be configured to tilt the holding member at a first angle relative to the arm (e.g., an angle between the holding arm 212a,b and the extension 218).

Figure 14:
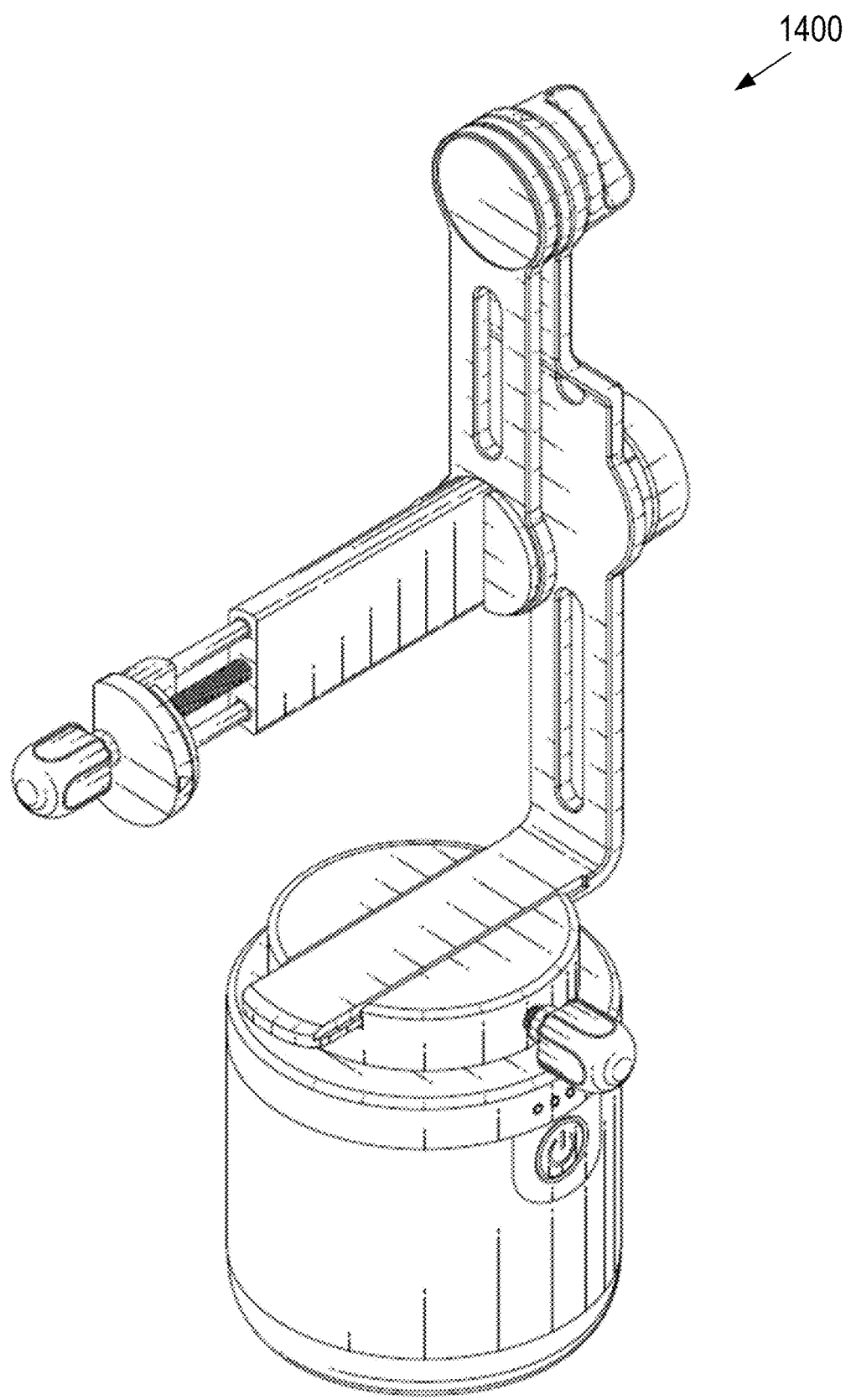
FIG. 14 depicts an angled view of the alternative motor mount in some embodiments.

FIGS. 14-19 include views of another version of the motor mount in some embodiments. FIG. 14 depicts an angled view 1400 of the alternative motor mount in some embodiments. The view of FIG. 14 may be similar to that of FIG. 3. The motor mount of FIG. 14 may have a different position and appearance of the bracket holding knob 304. In one example, the bracket holding knob of the motor mount of FIG. 14 is on the front of the motor mount and above the power button.

There may be other differences between the two motor mounts. In various embodiments, the motor mount of FIG. 14 has the same or similar functionality as that of FIG. 3.

Figure 15:
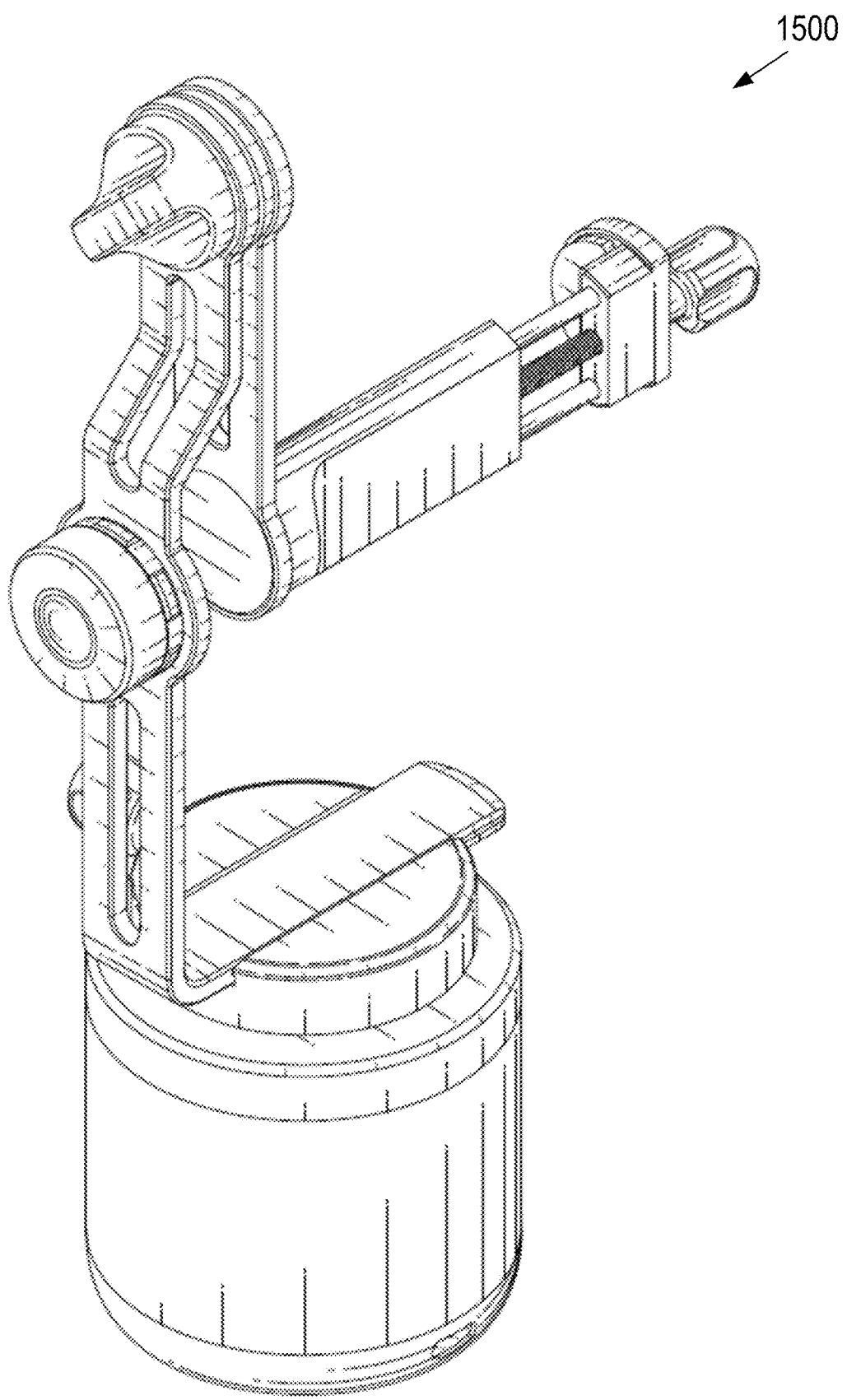
FIG. 15 depicts a back angled view of the alternative motor mount in some embodiments.

FIG. 15 depicts a back angled view 1500 of the alternative motor mount in some embodiments.

Figure 16:
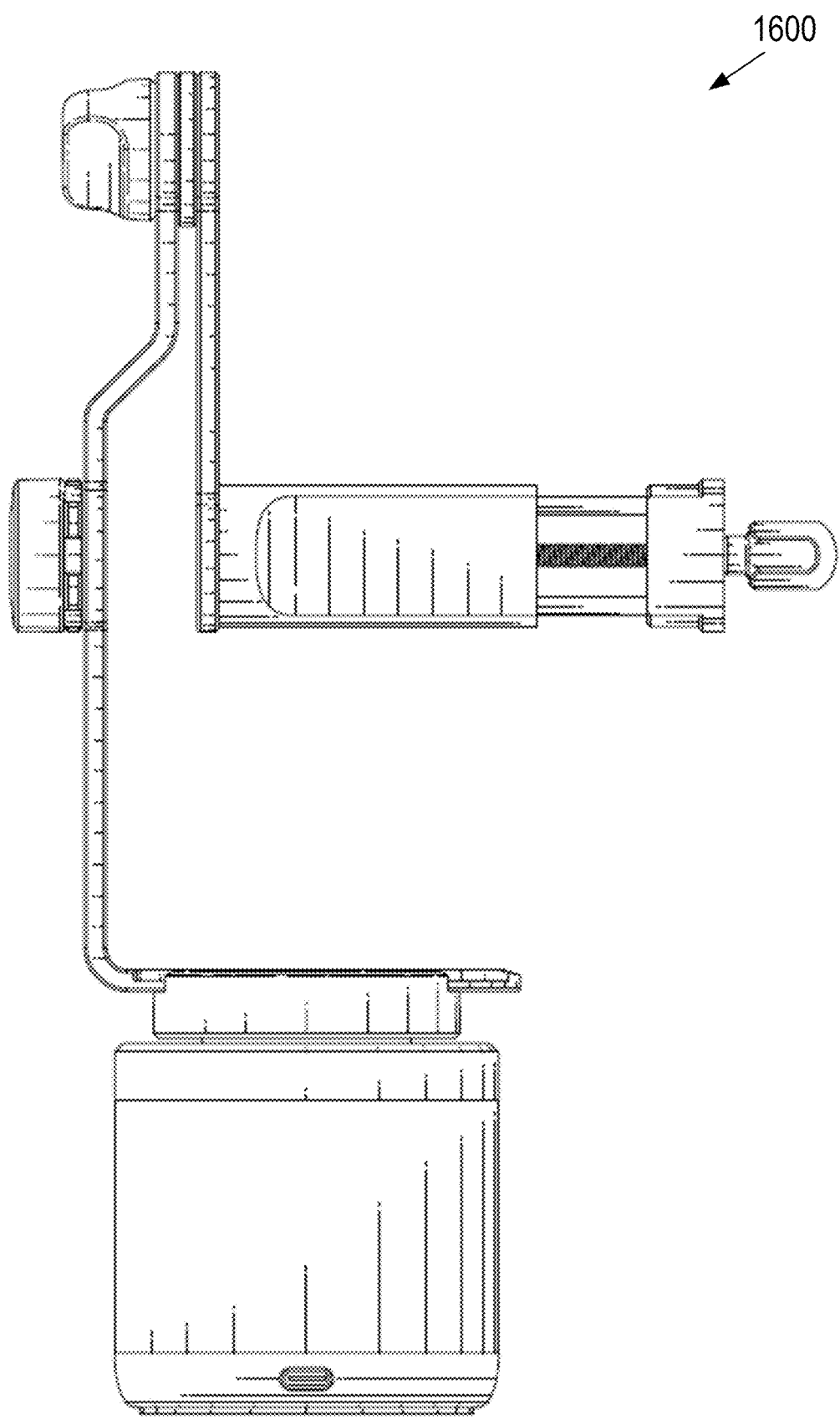
FIG. 16 depicts a back view of the alternative motor mount in some embodiments.

FIG. 16 depicts a back view 1600 of the alternative motor mount in some embodiments.

Figure 17:
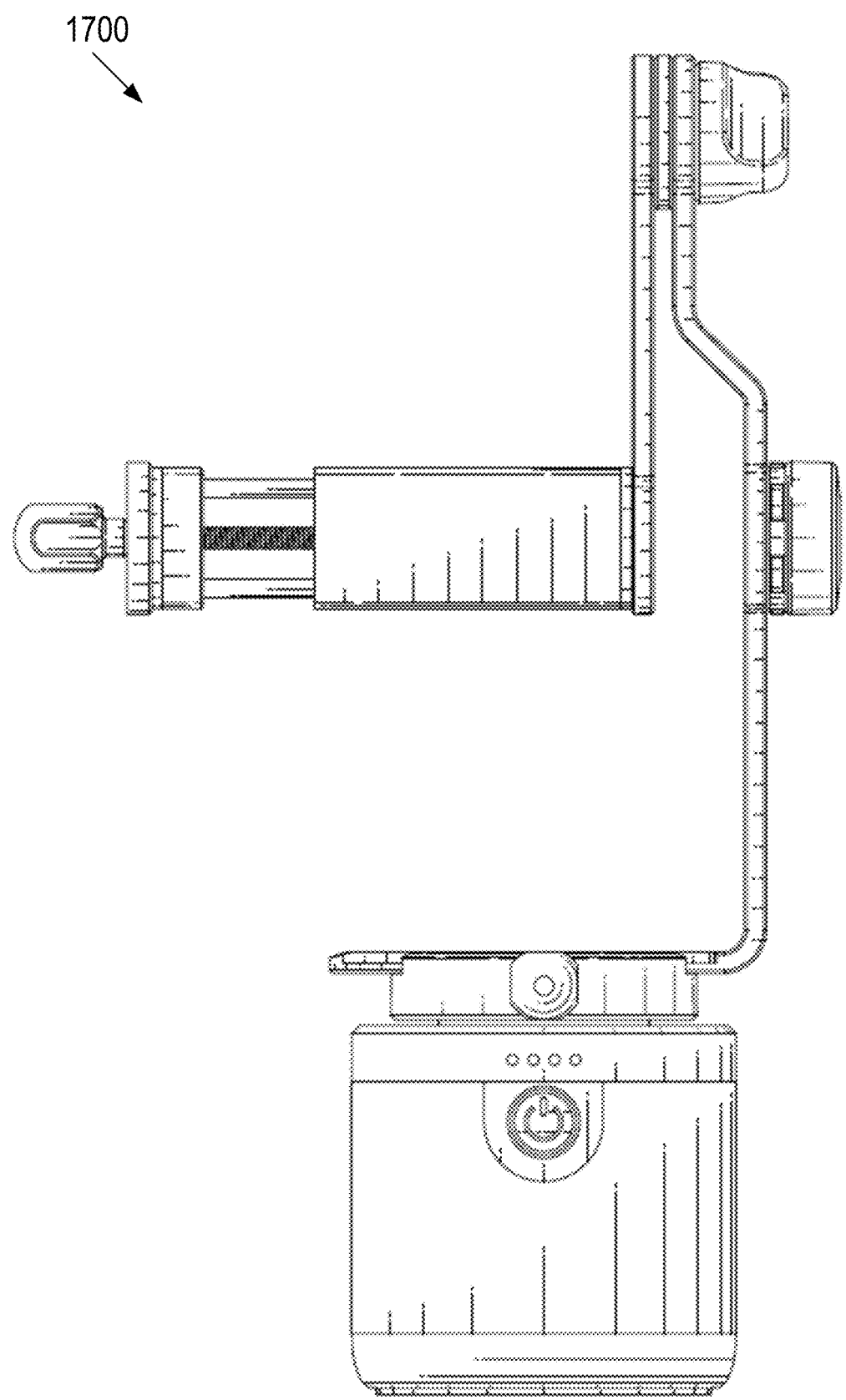
FIG. 17 depicts a front view of the alternative motor mount in some embodiments.

FIG. 17 depicts a front view 1700 of the alternative motor mount in some embodiments.

Figure 18:
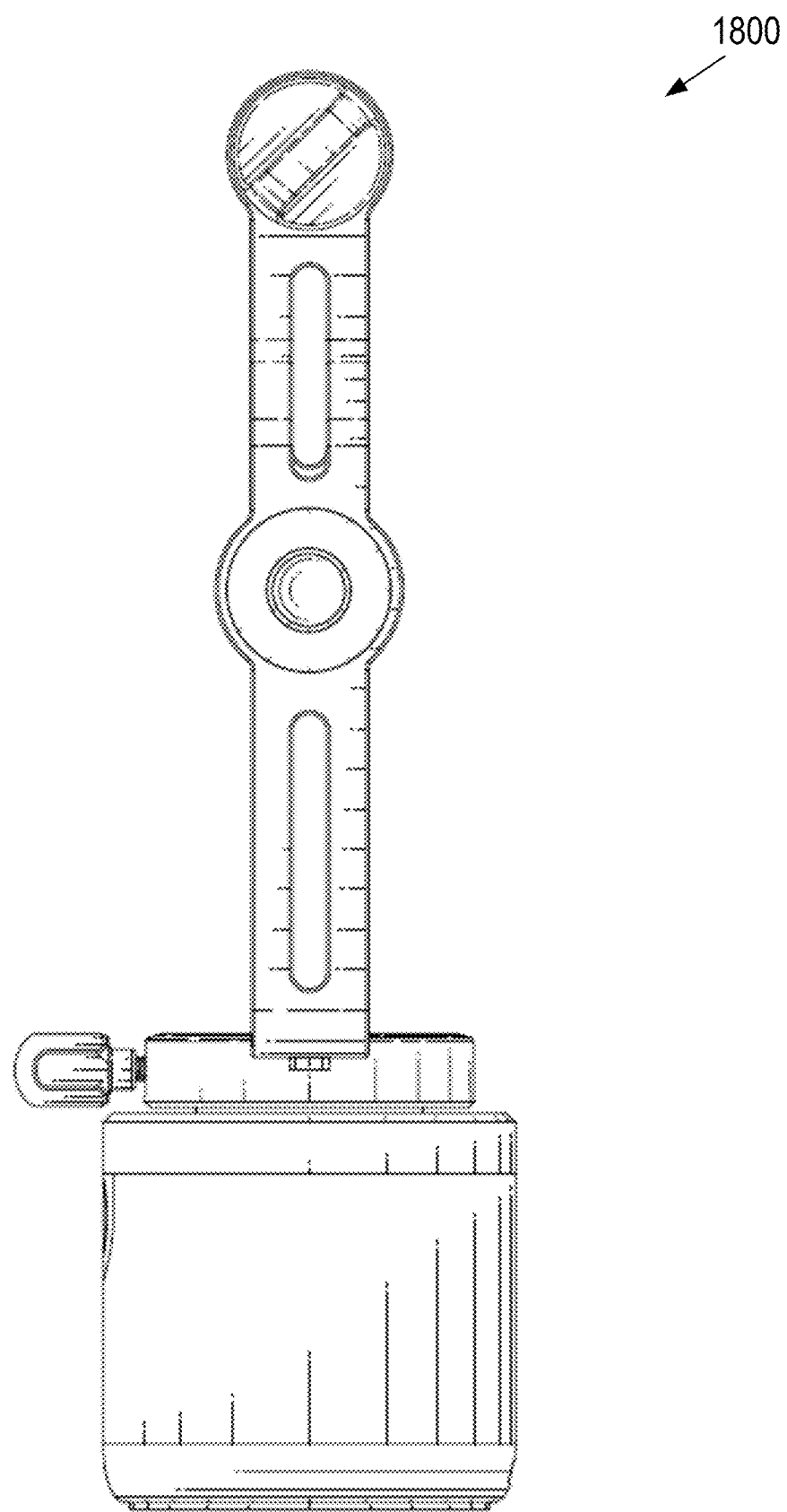
FIG. 18 depicts a right side view of the alternative motor mount in some embodiments.

FIG. 18 depicts a right side view 1800 of the alternative motor mount in some embodiments.

Figure 19:
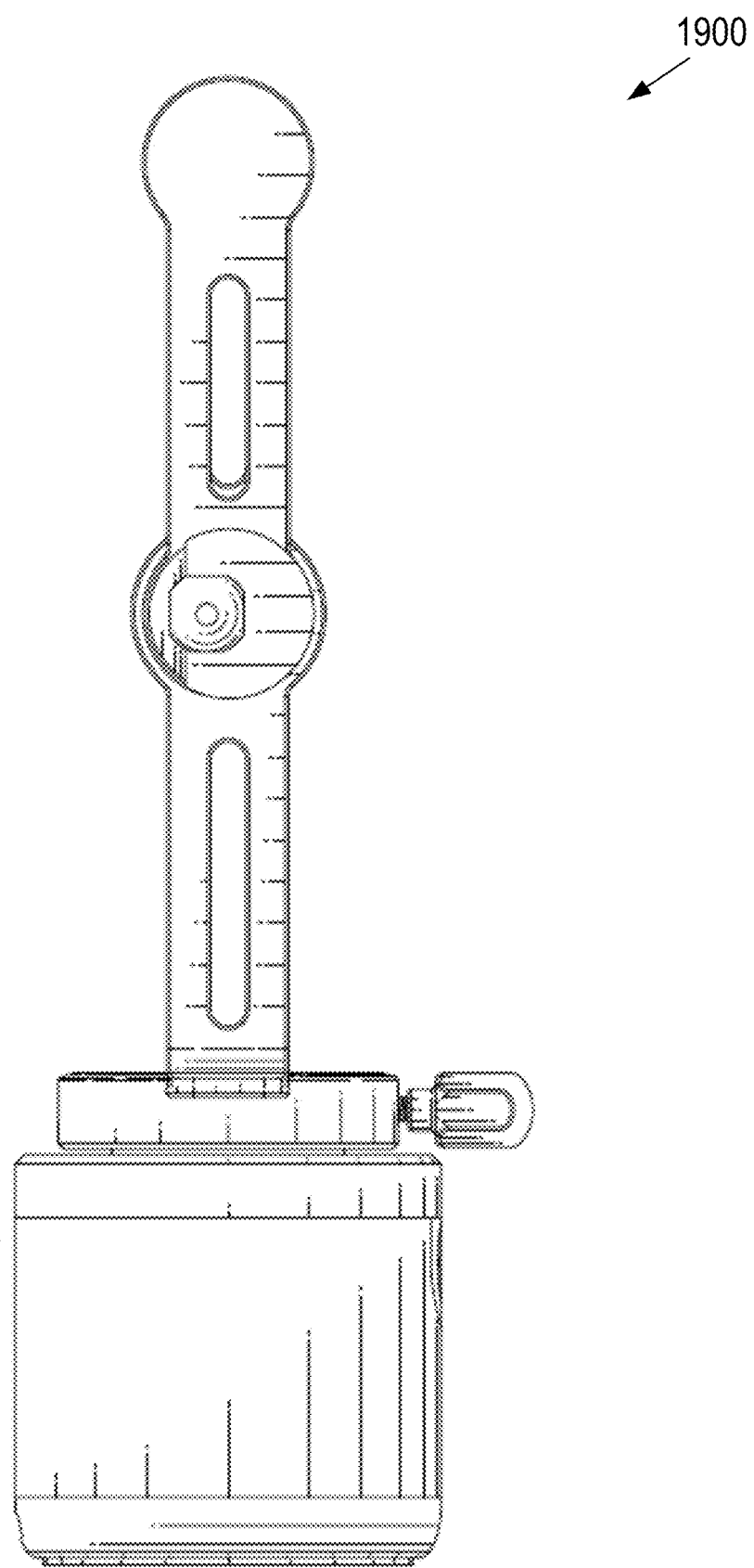
FIG. 19 depicts a left side view of the alternative motor mount in some embodiments.

FIG. 19 depicts a left side view 1900 of the alternative motor mount in some embodiments.

Figure 20:
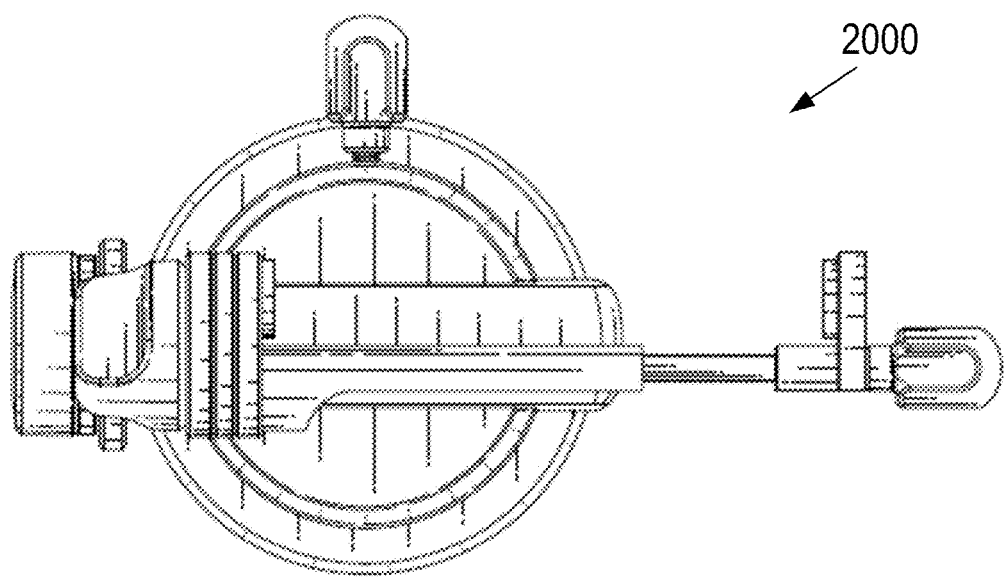
FIG. 20 depicts a view from above the alternative motor mount in some embodiments.

FIG. 20 depicts a view 2000 from above the alternative motor mount in some embodiments.

Figure 21:
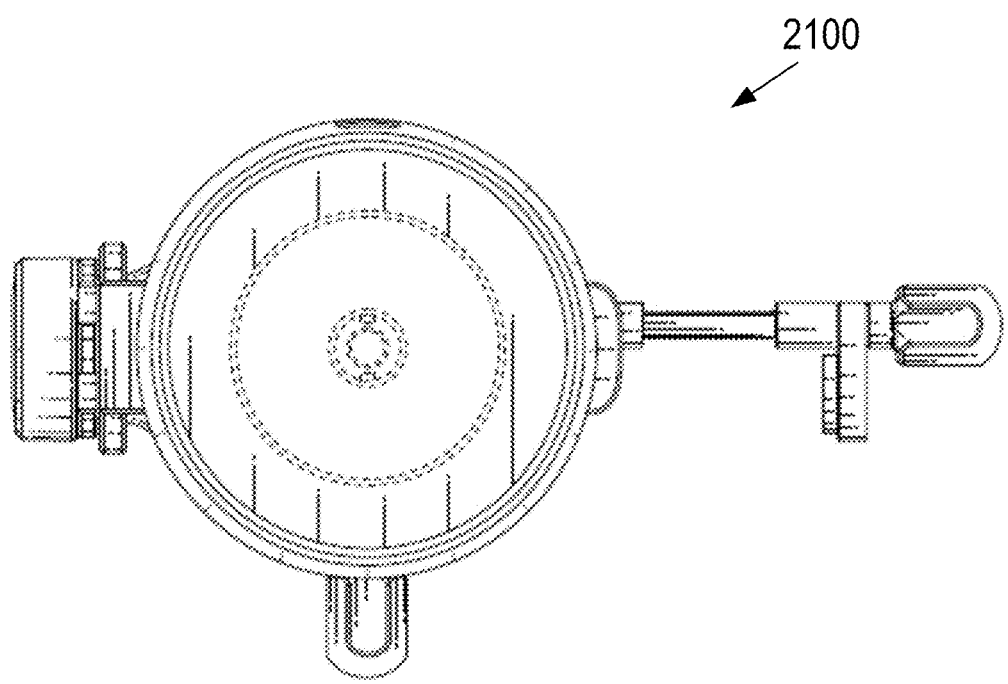
FIG. 21 depicts a bottom view from below alternative motor mount in some embodiments.

FIG. 21 depicts a bottom view 2100 from below alternative motor mount in some embodiments.

FIG. 22 depicts a side view and a front view of a motor mount 2202 in some embodiments. The motor mount 2202 may different from motor mount 300 in a number of ways. The motor mount 2202 does not include a full bracket but includes arm 2204 coupled to the rotational section 2206. The arm 2204 may pivot around the rotational section 2206. Further, the arm 2204 may be coupled to retention member 2208 which may be configured to hold a smartphone. In one example, the retention member 2208 may include sides that may be opened or closed (e.g., the sides or holding flanges may be held together by a spring that applies pressure to the sides of the smartphone). The retention member 2208 may be pivotably coupled to the arm 2204 to enable the smartphone to be tilted.

In various embodiments, the user may retain a smartphone in the retention member 2208 and position the phone at the desired angle (e.g., using the tiling function of the retention member 2208) such that the lens of the smartphone remains along the axis of rotation (e.g., the no-parallax point).

The motor mount 2202 may include an optional activation button 2210 (with functions similar to optional activation button 502).

The motor mount 2202 may include a motor and/or batteries in the base to enable the device to turn in different directions. The motor mount 2202 may otherwise perform similarly to the motor mount 300 as discussed herein.

FIG. 23 depicts a side view and a front view of a motor mount 2302 in some embodiments. The motor mount 2302 may be different from motor mount 300 in a number of ways. The motor mount 2302 does not include the holding arm (e.g., holding arm 212a,b) but rather couples the retention member 2304 to an extension 2306.

The extension 2306 is coupled to the rotational section 2308. The extension 2306 may pivot around the rotational section 2308. Further, the extension 2306 may be coupled to retention member 2304 which may be configured to hold a smartphone. In one example, the retention member 2304 may include sides that may be opened or closed (e.g., the sides or holding flanges may be held together by a spring that applies pressure to the sides of the smartphone). The retention member 2304 may be pivotably coupled to the extension 2306 (e.g., allow the user to tile the smartphone and hold it in place with a knob).

In various embodiments, the user may retain a smartphone in the retention member 2304 and position the phone at the desired angle (e.g., using the tiling function of the retention member 2308) such that the lens of the smartphone remains along the axis of rotation (e.g., the no-parallax point).

The motor mount 2302 may include an optional activation button 2310 (with functions similar to optional activation button 502).

The motor mount 2302 may include a motor and/or batteries in the base to enable the device to turn in the different directions. The motor mount 2302 may otherwise perform similarly to the motor mount 300 as discussed herein.

FIG. 24 depicts a side view and a front view of a motor mount 2402 in some embodiments. The motor mount 2402 may be different from motor mount 300 in a number of ways. The motor mount 2402 does not include an arm (e.g., holding arm 212a,b) but rather couples the retention member 2404 to the rotational section 2406 through a pivotable member 2408.

The retention member 2404 may be a clip or two retaining members. The sides of the clip and/or two retaining members may be tightened by a knob applying force to push them together. A user may place a smartphone between the retaining members 2404 and use the know to tighten the retaining members to hold the smartphone. Prior to tightening, the user may position the smartphone to be above the no-parallax point.

In some embodiments, the user may change the angle of the smartphone by tiling the pivotable member 2408. By pivoting, however, the camera of the smartphone may be positioned outside the axis of rotation and therefore no longer at the no-parallax point.

The motor mount 2402 may include a motor and/or batteries in the base to enable the device to turn in different directions. The motor mount 2402 may otherwise perform similarly to the motor mount 300 as discussed herein.

A component may be hardware or software. In some embodiments, the component may configure one or more processors to perform functions associated with the component. Although different components are discussed herein, it will be appreciated that the server system may include any number of components performing any or all functionality discussed herein.

The invention claimed is:

1. A system comprising:
a base with a bottom end and a top end opposite the bottom end;
a motor within the base, the motor being coupled to a rotational component of the base to turn the rotational component about an axis of rotation, the rotational component being at the top end of the base, the axis of rotation being perpendicular to the top end of the base; and
an arm coupled to the rotational component, the arm including a holding member to hold a digital device, a holding arm coupled to the holding member, an extension member, a coupling joint coupling the holding arm to the extension member, and a holding arm control knob, a portion of the extension member perpendicular to the top end of the base, the coupling joint allowing the holding arm to rotate from a neutral position in which the holding arm is parallel to the extension member to other positions in which the holding arm is at an angle relative to the extension member, wherein the holding arm control knob may be manually tightened by a user to hold the holding arm at the other positions and manually untightened by the user to return the holding arm to the neutral position.

2. The system of claim 1, wherein the motor rotates the rotational component in a direction parallel to the bottom end of the base.

3. The system of claim 1, wherein the arm further includes a sliding section, the sliding section of the arm being slidingly coupled across the rotational component.

4. The system of claim 1, further comprising an adjustable component to hold the arm at a particular position at the rotational component.

5. The system of claim 1, wherein the holding member includes two retaining members, wherein at least one of the two retaining members is adjustable to move towards an other of the two retaining members to widen or narrow a distance between the two retaining members, the two retaining members holding the digital device between them in a position whereby the axis of rotation passes through a camera of the digital device.

6. The system of claim 5, wherein a position of the holding member may be tilted such that the axis of rotation is at a desired position relative to a space between the two retaining members for aligning a field of view of the camera at the position where the axis of rotation passes through the camera to reduce parallax error.

7. The system of claim 1, further comprising a receiver to receive an activation signal and begin turning the rotational component by the motor.

8. The system of claim 7, further comprising an activation button configured to send the activation signal to the receiver.

9. The system of claim 1, further comprising an activation button configured to send an activation signal to the digital device, wherein the digital device captures one or more first images of an environment of the digital device, pauses to allow the motor to turn the rotational component, and then captures one or more second images of the environment.

10. A system comprising:
a base with a bottom end and a top end opposite the bottom end;
a motor within the base, the motor being coupled to a rotational component of the base to turn the rotational component about an axis of rotation, the rotational component being at the top end of the base, the axis of rotation being perpendicular to the top end of the base; and
an arm movably coupled to the rotational component, the arm including a holding member to hold a digital device, a holding arm coupled to the holding member, an extension member, a coupling joint coupling the holding arm to the extension member, and a holding arm control knob, a portion of the extension member perpendicular to the top end of the base, the coupling joint allowing the holding member to rotate from a neutral position in which the holding arm is parallel to the extension member to other positions in which the holding arm is at an angle relative to the extension member, wherein the holding arm control knob may be manually tightened by a user to hold the holding arm at the other positions and manually untightened by the user to return the holding arm to the neutral position.

11. The system of claim 10, wherein the motor rotates the rotational component in a direction parallel to the bottom end of the base.

12. The system of claim 10, wherein the arm further includes a coupling section, the coupling section being movably coupled to the rotational component.

13. The system of claim 10, further comprising an adjustable component to hold the holding member at a particular position at the rotational component.

14. The system of claim 10, wherein the holding member to hold the digital device that includes a camera in a position whereby the axis of rotation passes through the camera.

15. The system of claim 14, wherein the holding member holds the digital device at an angle to direct a field of view of the camera at a portion of an environment surrounding the system while the axis of rotation passes through the camera.

16. The system of claim 10, further comprising a receiver to receive an activation signal and begin turning the rotational component by the motor.

17. The system of claim 16, further comprising an activation button configured to send the activation signal to the receiver.

18. The system of claim 10, further comprising an activation button configured to send an activation signal to the digital device, wherein the digital device captures one or more first images of an environment of the digital device, pauses to allow the motor to turn the rotational component, and then captures one or more second images of the environment.

19. A method comprising:

providing a base with a bottom end and a top end opposite the bottom end;

installing a motor within the base, the motor being coupled to a rotational component of the base to turn the rotational component about an axis of rotation, the rotational component being at the top end of the base, the axis of rotation being perpendicular to the top end of the base; and movably coupling an arm to the rotational component, the arm including an extension member, a holding arm, a coupling joint coupling the holding arm to the extension member, a holding arm control knob, and at least one holding member coupled to the holding arm, a portion of the extension member perpendicular to the top end of the base, the coupling joint allowing the holding arm to rotate from a neutral position in which the holding arm is parallel to the extension member to other positions in which the holding arm is at an angle relative to the extension member, wherein the holding arm control knob may be manually tightened by a user to hold the holding arm at the other positions and manually untightened by the user to return the holding arm to the neutral position.

* * * * *